(12) United States Patent
Fjeldheim et al.

(10) Patent No.: US 12,365,538 B2
(45) Date of Patent: *Jul. 22, 2025

(54) AUTOMATED STORAGE AND RETRIEVAL SYSTEM COMPRISING A RELAY MODULE AND A METHOD OF OPERATING SUCH A SYSTEM

(71) Applicant: Autostore Technology AS, Nedre Vats (NO)

(72) Inventors: Ivar Fjeldheim, Haugesund (NO); Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,098

(22) Filed: Feb. 1, 2024

(65) Prior Publication Data

US 2024/0174441 A1    May 30, 2024

Related U.S. Application Data

(63) Continuation of application No. 17/937,914, filed on Oct. 4, 2022, now Pat. No. 11,919,711, which is a
(Continued)

(30) Foreign Application Priority Data

Apr. 25, 2018    (NO) .................................. 20180578

(51) Int. Cl.
B65G 1/04    (2006.01)
B65G 1/137    (2006.01)

(52) U.S. Cl.
CPC ......... *B65G 1/0464* (2013.01); *B65G 1/0485* (2013.01); *B65G 1/0492* (2013.01); *B65G 1/1378* (2013.01)

(58) Field of Classification Search
CPC .. B65G 1/0464; B65G 1/0485; B65G 1/0492; B65G 1/1378
See application file for complete search history.

(56) References Cited

U.S. PATENT DOCUMENTS 9,856,082 B2    1/2018  Hognaland
2008/0281717 A1  11/2008  Kortelainen
(Continued)

FOREIGN PATENT DOCUMENTS

CN    106660703 A    5/2017
CN    107466203 A    12/2017
(Continued)

OTHER PUBLICATIONS

Office Action issued in the counterpart Chinese Patent Application No. 201980028084.0, mailed on Aug. 23, 2021 (19 pages).
(Continued)

*Primary Examiner* — Saul Rodriguez
*Assistant Examiner* — Willie W Berry, Jr.
(74) *Attorney, Agent, or Firm* — Baker Botts L.L.P.

(57) ABSTRACT

An automated storage and retrieval system includes at least one relay module for relaying storage containers between a port column and an access station. The relay module is arranged below a port column. The relay module includes a port station, a first conveyor, a second conveyor, each arranged at a side of the port station, and a lateral displacement device. The port station receives storage containers dropped off from and to be picked up through the port column. The first conveyor is adapted to transport storage containers to an access station. The second conveyor is adapted for transporting storage containers from the access station. The lateral displacement device is arranged to trans-
(Continued)

port storage containers between the port station and the first conveyor, and between the second conveyor and the port station.

14 Claims, 16 Drawing Sheets

Related U.S. Application Data continuation of application No. 17/045,999, filed as application No. PCT/EP2019/060473 on Apr. 24, 2019, now Pat. No. 11,492,197.

(56) References Cited

U.S. PATENT DOCUMENTS

| | | | |
|---|---|---|---|
| 2012/0141236 A1* | 6/2012 | Korner | B65G 1/0407 414/222.01 |
| 2012/0177465 A1 | 7/2012 | Koholka | |
| 2016/0176638 A1 | 6/2016 | Toebes | |
| 2017/0225893 A1 | 8/2017 | Stevens et al. | |
| 2018/0086573 A1 | 3/2018 | Lindbo | |
| 2018/0162639 A1* | 6/2018 | Ingram-Tedd | B65G 1/0464 |
| 2018/0273298 A1* | 9/2018 | Wagner | B65G 1/1378 |

FOREIGN PATENT DOCUMENTS

| | | |
|---|---|---|
| CN | 107922115 A | 4/2018 |
| EP | 2923971 A1 | 9/2015 |
| GB | 1251446 A | 10/1971 |
| NO | 317366 B1 | 10/2004 |
| WO | 2014/075937 A1 | 5/2014 |
| WO | 2014/090684 A1 | 6/2014 |
| WO | 2015/193278 A1 | 12/2015 |
| WO | 2016/166294 A1 | 10/2016 |
| WO | 2016/198467 A1 | 12/2016 |
| WO | 2017/211640 A1 | 12/2017 |
| WO | 2018069282 A1 | 4/2018 |

OTHER PUBLICATIONS

Search Report issued in counterpart Chinese Patent Application No. 201980028084.0, mailed on Aug. 23, 2021 (3 pages).

* cited by examiner

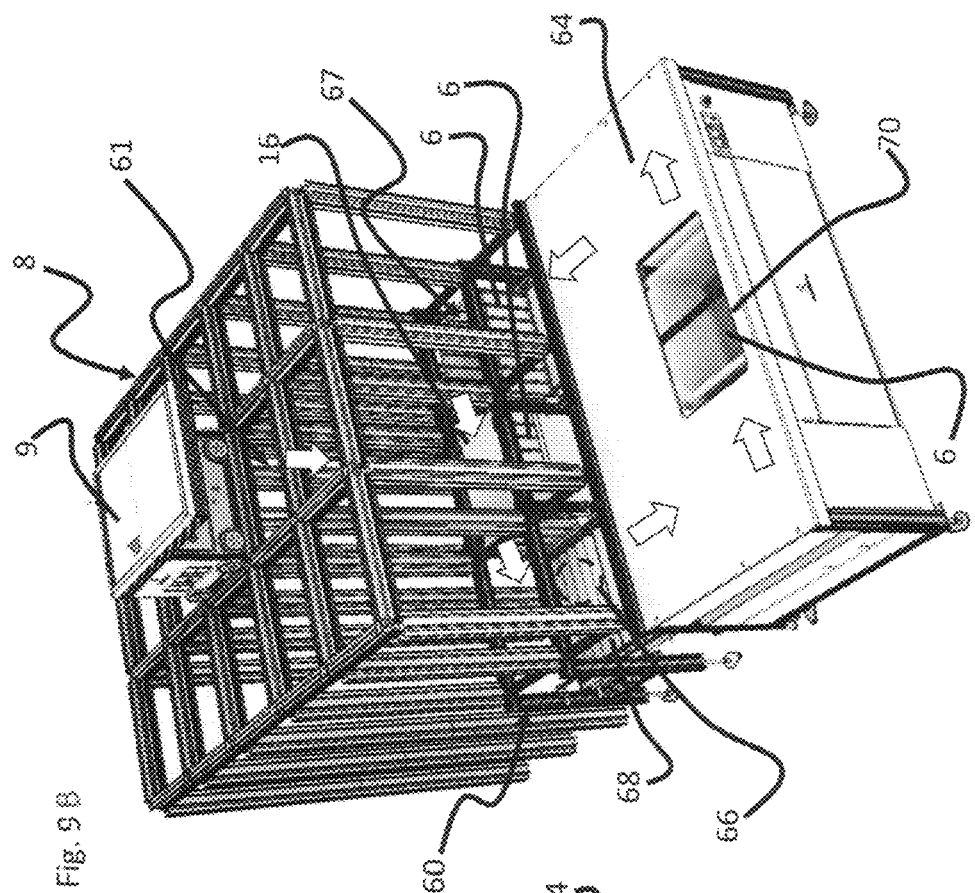
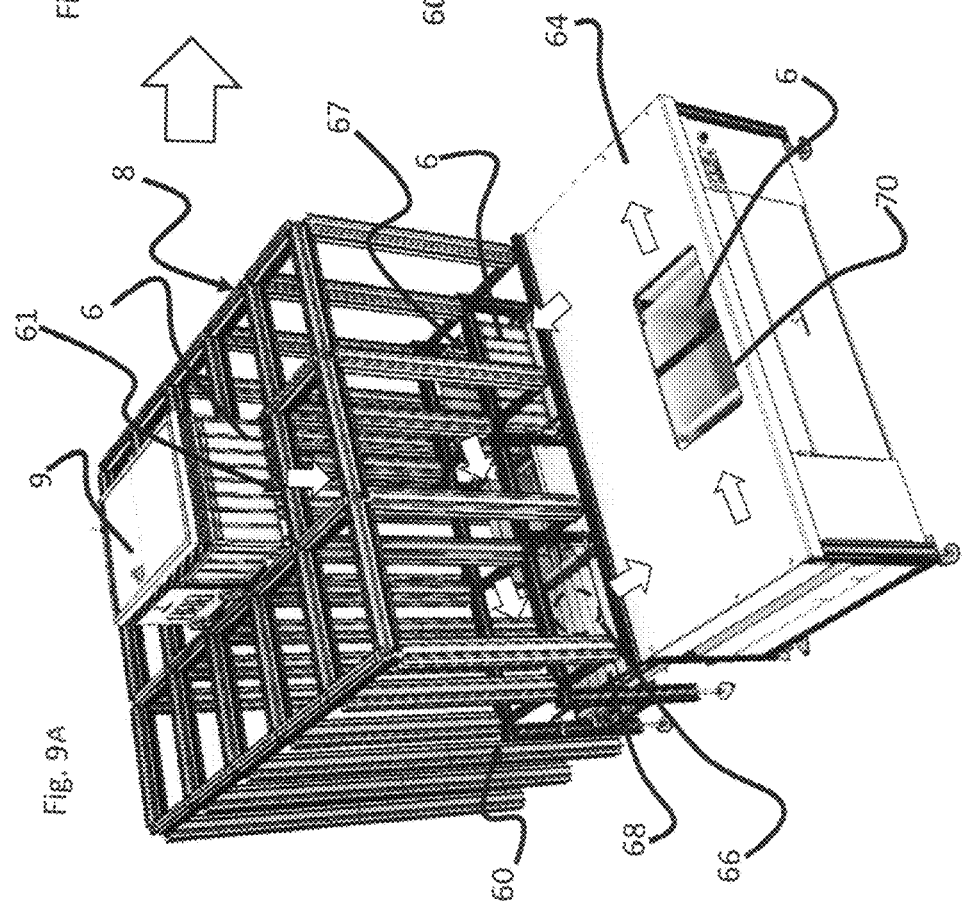

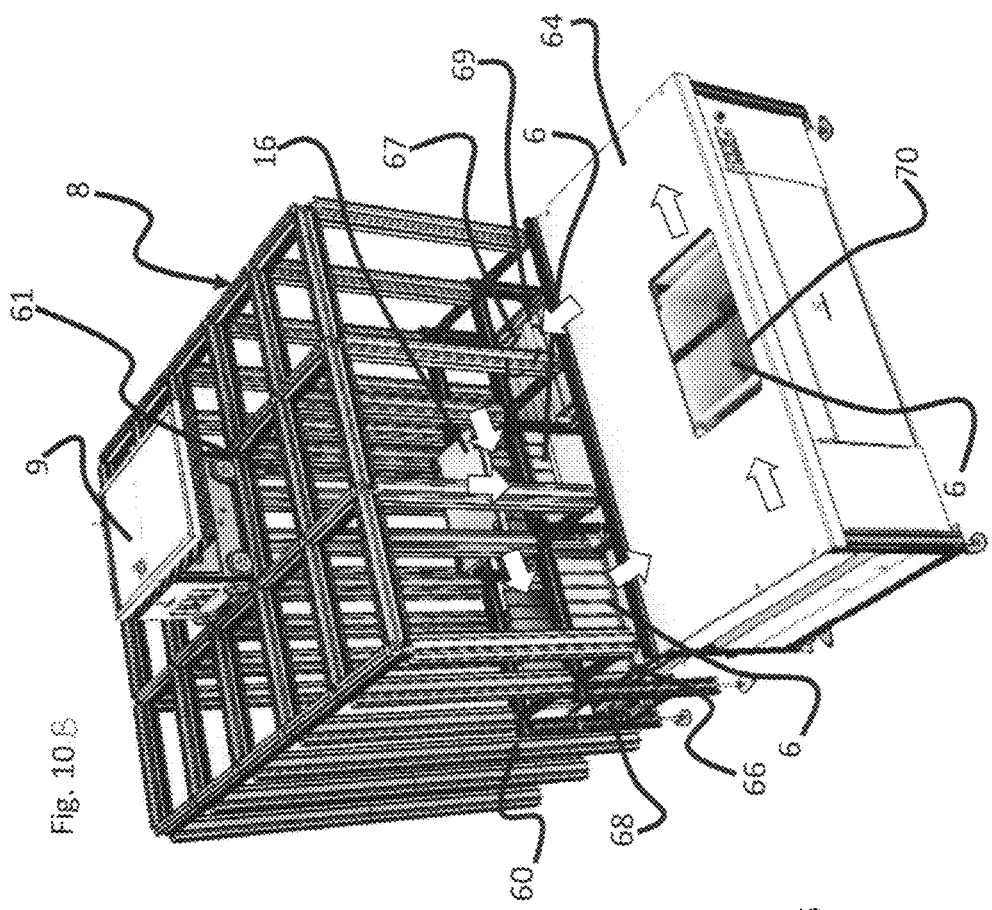
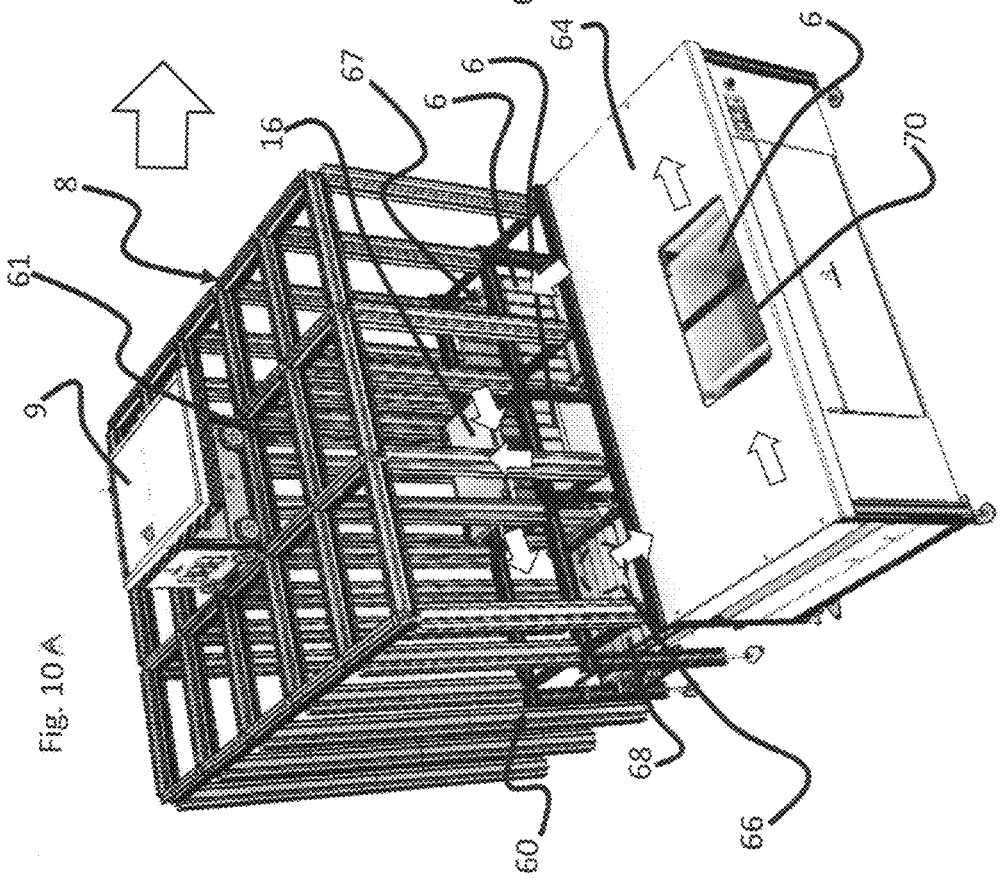

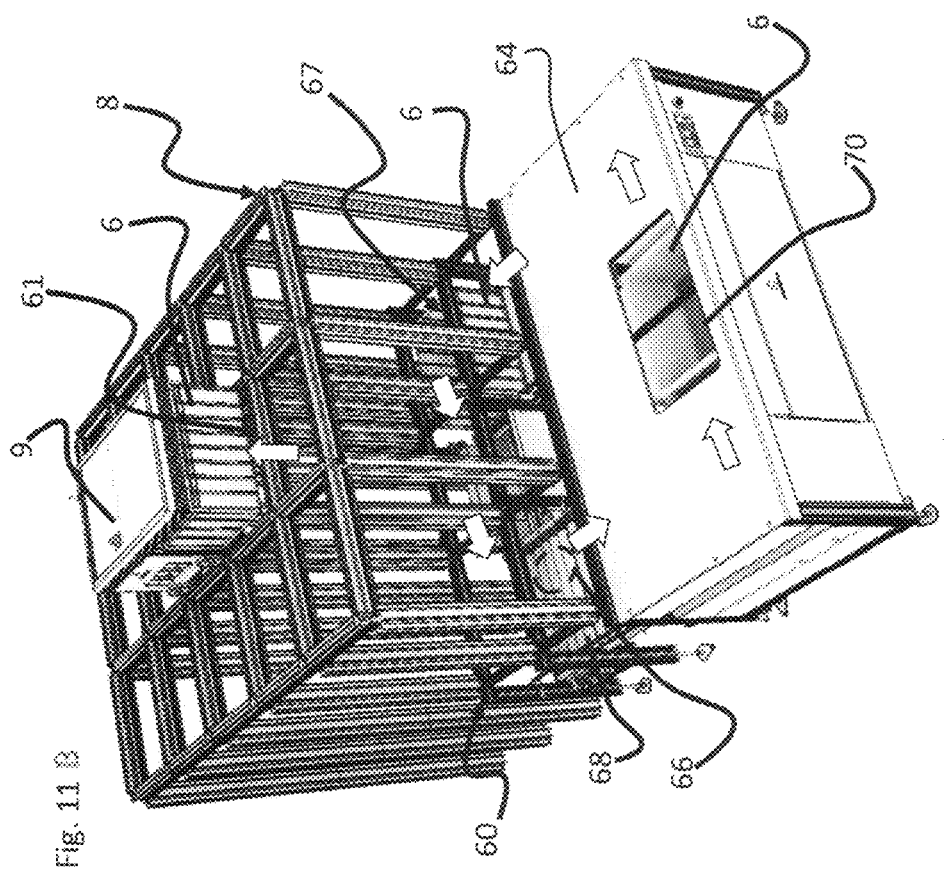
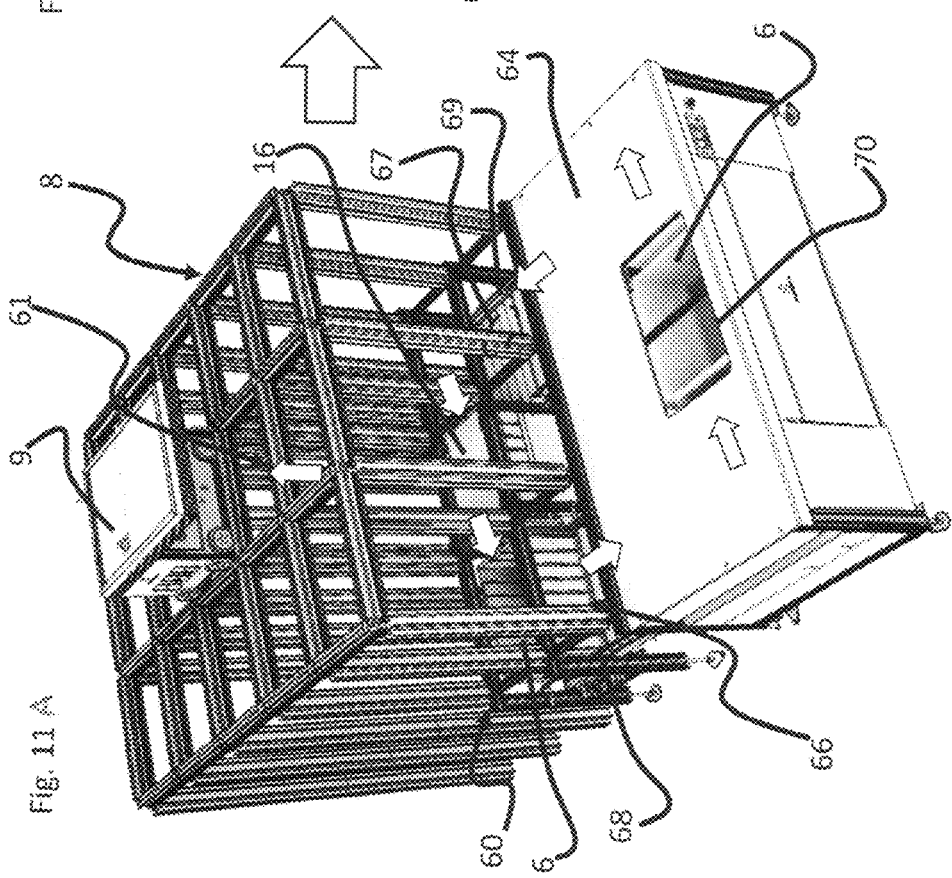

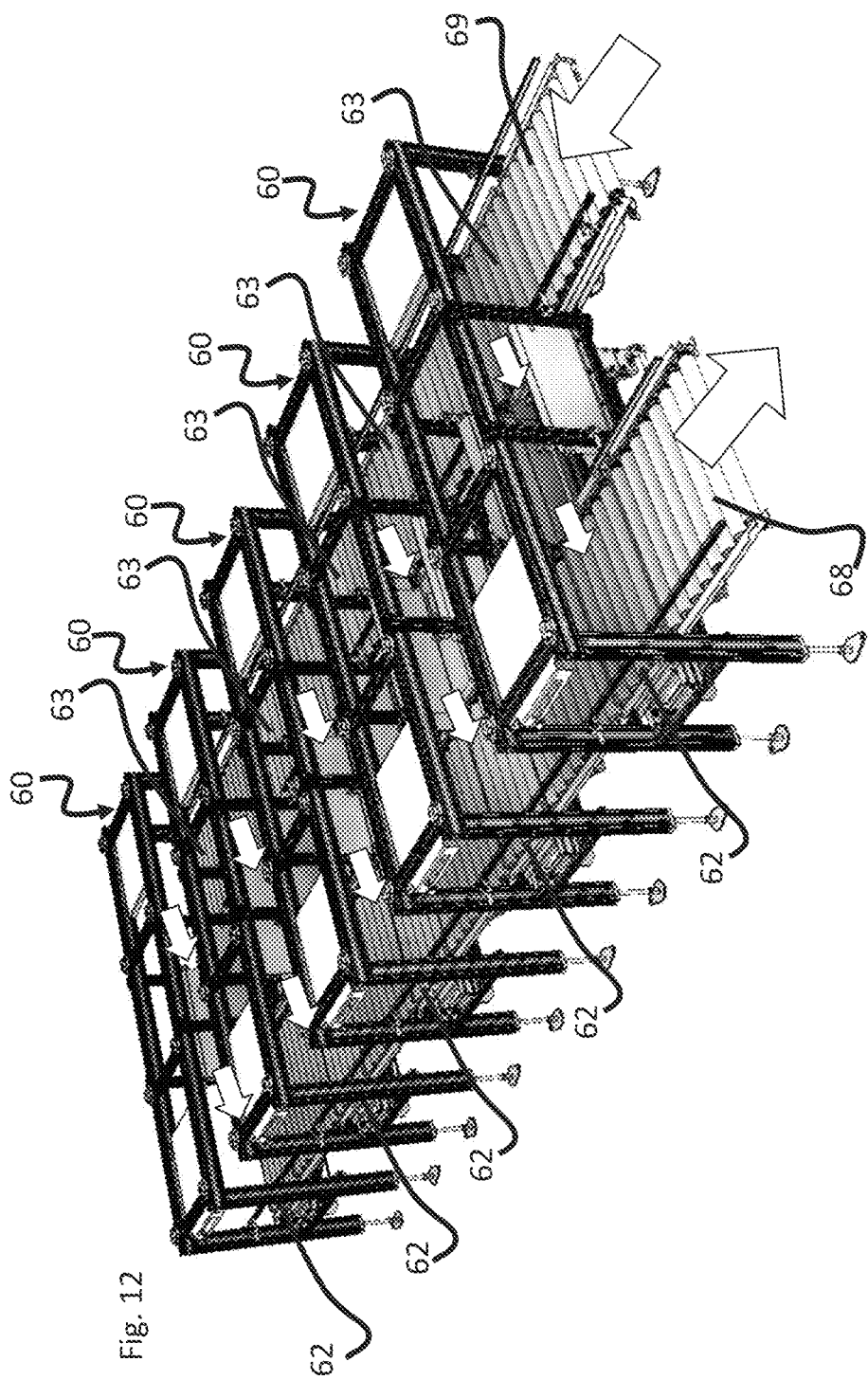

AUTOMATED STORAGE AND RETRIEVAL SYSTEM COMPRISING A RELAY MODULE AND A METHOD OF OPERATING SUCH A SYSTEM

TECHNICAL FIELD

The present invention relates to an automated storage and retrieval system comprising a relay module for transporting storage containers between a port column and an access station, and a method of operating such an automated storage and retrieval system.

BACKGROUND

FIG. 1 discloses a framework structure 1 of a typical prior art automated storage and retrieval system and FIGS. 2A-2C disclose different container handling vehicles 9 of such a system.

The framework structure 1 comprises a plurality of upright members 2 and a plurality of horizontal members 3, which are supported by the upright members 2. The members 2, 3 may typically be made of metal, e.g. extruded aluminium profiles.

The framework structure 1 defines a storage grid 4 comprising storage columns 5 arranged in rows, in which storage columns 5 store storage containers 6, also known as bins, stacked one on top of another to form stacks 7. Each storage container 6 may typically hold a plurality of product items (not shown), and the product items within a storage container 6 may be identical, or may be of different product types depending on the application. The framework structure 1 guards against horizontal movement of the containers 6 in the stacks 7, and guides vertical movement of the containers 6, but does normally not otherwise support the storage containers 6 when stacked.

A track system 8 is arranged in a grid pattern across the top of the storage columns 5. On this track system 8 a plurality of container handling vehicles 9 are operated to raise storage containers 6 from and lower storage containers 6 into the storage columns 5, and also to transport the storage containers 6 above the storage columns 5. The track system 8 comprises a first set of parallel tracks 10 arranged to guide movement of the container handling vehicles 9 in a first direction X across the top of the frame structure 1, and a second set of parallel tracks 11 arranged perpendicular to the first set of tracks 10 to guide movement of the container handling vehicles 9 in a second direction Y, which is perpendicular to the first direction X. In this way, the track system 8 defines grid columns 12 above which the container handling vehicles 9 can move laterally above the storage columns 5, i.e. in a plane which is parallel to the horizontal X-Y plane.

Each container handling vehicle 9 comprises a vehicle body 13 and first and second sets of wheels 14, 15 which enable the lateral movement of the container handling vehicle 9, i.e. the movement in the X and Y directions. In FIG. 2A two wheels in each of the sets 14, 15 are visible, while in FIGS. 2B and 2C only two wheels in one of the set of wheels 14 are visible. The first set of wheels 14 is arranged to engage with two adjacent tracks of the first set 10 of tracks, and the second set of wheels 15 arranged to engage with two adjacent tracks of the second set 11 of tracks. Each set of wheels 14, 15 can be lifted and lowered, so that the first set of wheels 14 and/or the second set of wheels 15 can be engaged with the respective set of tracks 10, 11 at any one time.

Each container handling vehicle 9 also comprises a lifting device 16 (see FIGS. 2B and 2C) for vertical transportation of storage containers 6, e.g. raising a storage container 6 from and lowering a storage container 6 into a storage column 5. The lifting device may be arranged inside the body 13 (as in FIG. 2A) or outside the body 13 (as disclosed in FIGS. 2B and 2C). The lifting device 16 may comprise a lifting frame 18 which is adapted to engage a storage container 6. The lifting frame 18 can be lowered from the vehicle body 13 so that the position of the lifting frame with respect to the vehicle body 13 can be adjusted in a third direction Z, which is orthogonal the first direction X and the second direction Y.

Conventionally, and also for the purpose of this application, Z=1 identifies the uppermost layer of the grid 4, i.e. the layer immediately below the track system 8, Z=2 the second layer below the track system 8, Z=3 the third layer etc. In the exemplary prior art grid 4 disclosed in FIG. 1, Z=8 identifies the lowermost, bottom layer of the grid 4. Consequently, as an example and using the Cartesian coordinate system X, Y, Z indicated in FIG. 1, the storage container identified as 7' in FIG. 1 can be said to occupy grid location or cell X=10, Y=2, Z=3. The container handling vehicles 9 can be said to travel in layer Z=0 and each grid column can be identified by its X and Y coordinates.

Each container handling vehicle 9 comprises a storage compartment or space for receiving and stowing a storage container 6 when transporting the storage container 6 across the top of the grid 4. The storage space may comprise a cavity arranged centrally within the vehicle body 13 (FIG. 2A), e.g. as is described in WO2014/090684A1, the contents of which are incorporated herein by reference. Alternatively, the storage compartment or space can be arranged on the side of the body as disclosed in FIGS. 2B and 2C, i.e. the container handling vehicles 9 may have a cantilever construction, as is described in N0317366, the contents of which are also incorporated herein by reference.

The container handling vehicles 9 may have a footprint 22 (see FIG. 4) which is generally equal to the extension of a grid column 12 in the X and Y directions, e.g. as is described in WO2015/193278A1, the contents of which are incorporated herein by reference. Alternatively, the container handling vehicles 9 may have a footprint which is larger than the extension of a grid column 12 in the X and Y directions, e.g. as is disclosed in WO2014/090684A1.

The track system 8 may be a single track system, as is shown in FIG. 3. Alternatively, the track system 8 may be a double track system, as is shown in FIG. 4, thus allowing a container handling vehicle 9 having a footprint 22 generally corresponding to the lateral area defined by the extension of a grid column 12 to travel along a row of grid columns 12 even if another container handling vehicle 9 is positioned above a grid column 12 neighbouring that row.

In a storage grid, a majority of the grid columns 12 are storage columns 5, i.e. grid columns where storage containers 6 are stored in stacks. However, a grid normally has at least one grid column which is used not for storing storage containers, but which comprises a location where the container handling vehicles can drop off and/or pick up storage containers so that they can be transported to an access station where the storage containers can be accessed from outside of the grid or transferred out of or into the grid. Within the art, such a location is normally referred to as a "port" and the grid column in which the port is located may be referred to as a "port column".

The grid 4 in FIG. 1 comprises two port columns 19 and 20. The first port column 19 may for example be a dedicated drop-off port column where the container handling vehicles 9 can drop off storage containers to be transported to an access or a transfer station (not shown), and the second port column 20 may be a dedicated pick-up port column where the container handling vehicles 9 can pick up storage containers that have been transported to the grid 4 from an access or a transfer station.

The access station may typically be a picking or a stocking station where product items are removed from or positioned into the storage containers. In a picking or a stocking station, the storage containers are normally never removed from the automated storage and retrieval system, but are returned back into the grid once accessed. A port can also be used for transferring storage containers out of or into the grid, e.g. for transferring storage containers to another storage facility (e.g. to another grid or to another automated storage and retrieval system), to a transport vehicle (e.g. a train or a lorry), or to a production facility.

A conveyor system comprising conveyors is normally employed to transport the storage containers between the ports and the access station.

If the port and the access station are located at different levels, the conveyor system may comprise a lift device for transporting the storage containers vertically between the port and the access station.

The conveyor system may be arranged to transfer storage containers between different grids, e.g. as is described in WO2014/075937A1, the contents of which are incorporated herein by reference.

WO2016/198467A1, the contents of which are incorporated herein by reference, discloses an example of a prior art access system having conveyor belts (FIGS. 5a and 5b in WO2016/198467A1) and a frame mounted track (FIGS. 6a and 6b in WO2016/198467A1) for transporting storage containers between ports and work stations where operators can access the storage containers.

When a storage container 6 stored in the grid 4 disclosed in FIG. 1 is to be accessed, one of the container handling vehicles 9 is instructed to retrieve the target storage container from its position in the grid 4 and transport it to the drop-off port 19. This operation involves moving the container handling vehicle 9 to a grid location above the storage column in which the target storage container is positioned, retrieving the storage container from the storage column using the container handling vehicle's lifting device (not shown), and transporting the storage container to the drop-off port 19. If the target storage container 6 is located deep within a stack 7, i.e. with one or a plurality of other storage containers positioned above the target storage container, the operation also involves temporarily moving the above-positioned storage containers prior to lifting the target storage container from the storage column. This step, which is sometimes referred to as "digging" within the art, may be performed with the same container handling vehicle 9 that is subsequently used for transporting the target storage container to the drop-off port 19, or with one or a plurality of other cooperating container handling vehicles 9. Alternatively, or in addition, the automated storage and retrieval system may have container handling vehicles 9 specifically dedicated to the task of temporarily removing storage containers 6 from a storage column. Once the target storage container has been removed from the storage column, the temporarily removed storage containers 6 can be repositioned into the original storage column. However, the removed storage containers 6 may alternatively be relocated to other storage columns.

When a storage container 6 is to be stored in the grid 4, one of the container handling vehicles 9 is instructed to pick up the storage container from the pick-up port 20 and transport it to a grid location above the storage column where it is to be stored. After any storage containers 6 positioned at or above the target position within the storage column stack have been removed, the container handling vehicle 9 positions the storage container 6 at the desired position. The removed storage containers may then be lowered back into the storage column, or relocated to other storage columns.

For monitoring and controlling the automated storage and retrieval system, e.g. monitoring and controlling the location of respective storage containers within the grid 4, the content of each storage container 6, and the movement of the container handling vehicles 9 so that a desired storage container can be delivered to the desired location at the desired time without the container handling vehicles 9 colliding with each other, the automated storage and retrieval system comprises a control system, which typically is computerised and comprises a database for keeping track of the storage containers.

A problem associated with known automated storage and retrieval systems is that the area surrounding the pick-up and drop-off ports may become congested with container handling vehicles instructed to drop off or pick up storage containers. This may seriously impede the operation of the automated storage and retrieval system. In small systems this situation may possibly be alleviated by adding ports to the grid, as this will allow the container handling vehicles to be distributed among a larger number of ports in order to avoid congestion. However, if ports are added, the conveyor system infrastructure must normally be increased. This requires space, which may not necessarily be available. Also, adding conveyor system infrastructure is costly.

Another problem with prior art automated storage and retrieval systems is that the separate drop-off ports 19 and pick-up ports 20 require the container handling vehicles 9 to move to a storage column after drop-off to retrieve a new storage container 6. Likewise, the container handling vehicles 9 have to be empty of a storage container 6 when they are sent to a pick-up port 20 to pick up a storage container. This results in an inefficiency and causes increased congestion around the ports, as container handling vehicles 9 are moving around on the grid without a storage container 6 as payload. In addition, the drop-off 19 and pick-up 20 ports may take up space on the grid which could be used for other purposes such as the movement of container handling vehicles 9.

In view of the above, it is desirable to provide an automated storage and retrieval system, and a method for operating such a system, that solve or at least mitigate one or more of the aforementioned problems related to the use of prior art storage and retrieval systems.

In addition to the above, US 2018/086573 describes a port column for vertical transport of containers by a clamping system, and a conveyor for transporting the container from an access station.

SUMMARY

The invention is set forth in the independent claims and the dependent claims describe alternatives of the invention.

The invention relates to an automated storage and retrieval system comprising:
  a track system comprising a first set of parallel tracks arranged in a horizontal plane and extending in a first direction, and a second set of parallel track arranged in the horizontal plane and extending in a second direction which is orthogonal to the first direction, said first and second sets of tracks forming a grid pattern in the horizontal plane comprising a plurality of adjacent grid cells, each grid cell comprising a grid opening defined by a pair of neighboring tracks of the first set of tracks and a pair of neighboring tracks of the second set of tracks;

a plurality of storage columns each column being arranged to store a respective stack of storage containers wherein the storage columns are located beneath the track system, wherein each storage column is located vertically below a grid opening;

a plurality of container handling vehicles for lifting and moving storage containers stacked in the stacks, each container handling vehicle being configured to move on the track system above the storage columns, at least one port column, said port column forming a downwards vertical projection of a grid opening through which the container handling vehicles can drop off and pick up storage containers, characterised in that the system comprises at least one relay module for relaying storage containers between a port column and an access station, the relay module being arranged below a port column, and wherein the relay module comprises;

a port station for receiving storage containers dropped off from and to be picked up through the port column, a first conveyor and a second conveyor, arranged at a side of the port station, the first conveyor being adapted to transport storage containers to an access station, the second conveyor being adapted for transporting storage containers from the access station, a lateral displacement device that is arranged for transporting storage containers between the port station and the first conveyor, and between the second conveyor and the port station.

Thus, according to the invention, at least one relay module may be installed in the grid with a port station arranged at a lower end of one port column allowing both pick-up and drop-off of storage containers through a port column.

The lower end of a port column and thus the port station may be arranged anywhere below the uppermost layer of the grid, i.e. Z=1 the layer immediately below the track system, such that the relay module is flush with the track system. The port station may further be located at any distance below the track system, for example Z=2, 3, 4, 5, 6, 7, 8, 9, 10, etc. In aspects, the grid may only have a certain height, for example Z=5, yet the port station may be arranged at a distance further below the lowest level of the grid such as Z=6 or any arbitrary distance below Z=5. For example the port station may be located on a ground floor level, e.g. Z=6 such that the access station is accessible to human operators. Conveyors may be arranged such that the storage containers are transported a distance in length and height, so that the relay module may be arranged in similar height to a track system.

Advantageously, the storage containers may be transported in a loop between the relay module and the access station, that a storage container may be retrieved through the same column as which it is deposited. Furthermore, the loop may comprise a plurality of storage containers being circulated and therefore act as a buffer helping to reduce congestion on the track system around the port area. A container handling vehicle may, immediately or very soon after having deposited a storage container in the port station, pick up a new storage container, thus avoiding the vehicle traveling without payload to a separate pickup port.

The at least one relay module may be arranged in an existing grid pattern, whereby existing storage columns may be repurposed to form a port column, and at least one relay module arranged below this port column. Advantageously, the relay module may be arranged below any existing kind of track system, whether single or double track. A relay module may typically occupy an area corresponding to a horizontal dimension of 3X by 1 Y grid cells, or IX by 3Y grid cells. A port station may occupy the area of an intermediate grid cell, with the rest of the relay module occupying the area of the remaining grid cells on either side. The first conveyor and a second conveyor being arranged at a side of the port station, may thus entail that they are arranged at a distance vertically and horizontally from the port station. In aspects, the port station may be arranged with two conveyors arranged at one side of the port station, such that the lateral displacement device travels past the proximal conveyor to reach the distal conveyor. In aspect, the port station may be arranged with two conveyors each arranged at transverse sides to the port station, such that the lateral displacement device moves in either of the transverse directions to reach a conveyor. The position on the conveyors on the side of the port station define a first conveyor position and a second conveyor position, which may also comprise an area corresponding to one grid cell each. In some aspects of the invention, the first conveyor position and the second conveyor position may also be arranged at the lower end of port columns, through which storage containers may be deposited and retrieved. In some aspects, the first and the second conveyor may extend at least 3X by 0.5 Y grid cells, each such that the relay module has a footprint corresponding to 3X by 1 5Y grid cells or vice versa with regard to X and Y dimensions. In other aspects the conveyors may extend such that the relay module has a footprint corresponding to 3X by 2Y grid cells, in yet further aspects the relay module may occupy an area up to 3X by 3Y grid cells in extent. In other aspects, the relay module may comprise more than 3 grid cells in extent, for example 5X by 1 Y, or IX by 5Y In aspects, at least one relay module is provided adjoining or detached from a storage grid, where a track system is arranged between at least one relay module and storage grid. Storage containers may thus be transported across the track system to the at least one relay module. In aspects at least one relay module may not be attached to the storage grid by a track system, but a port access vehicle may move in a horizontal plane above the track system and carry storage containers across from the storage grid to the relay modules.

Preferentially, the port station may comprise guiding means, such as guiding panels for guiding the storage containers onto a lateral displacement device as they are lowered down through the port column. The port station may also comprise guiding means arranged to guide storage containers as they are transported between conveyors and the port station by the lateral displacement device, thus ensuring that the storage container is in an aligned orientation, which facilitates the lifting device to engage with a container.

In an aspect of the invention, the conveyors may comprise rolls with integrated motors mounted between parallel railings. Advantageously, the rolls allow the lateral displacement device to be arranged parallel to the longitudinal direction of the rolls. Thus, storage containers may easily be moved perpendicularly to the transport direction of the conveyors. In other aspects of the invention, different kinds of conveyors may be used which also allow the movement of storage containers perpendicular to the transport direction of the conveyors such as conveyor belts, wheels, balls or any similar means which will be apparent to the person skilled in the art based on the disclosure of the invention herein. Though the first conveyor may be adapted to transport storage containers to an access station, and the second conveyor may be adapted to transport storage containers from an access station, their working directions may be reversed should the need arise.

In an aspect of the invention, the lateral displacement device may comprise any of; a rail mounted trolley, belts, conveyor rolls and conveyor balls. Preferably, the lateral displacement device may comprise a rail mounted trolley, as this aspect provides a high degree of reliability with regard to positioning the storage container in an aligned orientation as storage containers are moved between the conveyors and port station.

In aspects of the invention, the access station may be of any kind of access station where the storage containers can be accessed from outside of the automated storage and retrieval system or transferred out of or into the grid. The access station may in some aspects be located a distance away from the relay module, such that storage containers are transported along a conveyor to the access station. The access station may comprise any picking arrangement which is known in the art. In aspects of the invention, the conveyors may also transport storage containers to a plurality of access stations.

In an aspect of the invention, each relay module may include sensors to measure; the weight of a storage container, whether a storage container is located on the first conveyor position and/or second conveyor positions, the speed of the lateral displacement device and the speed of the roller conveyors. Electric powering means may be provided by cabling arranged inside the framework of a relay module. Each relay module may comprise a control unit, to control and measure the different components, sensors and electric drives in the module. The control unit, power and sensor network of a relay module is adapted to be connected with another relay module, such that power may be distributed, measurements and control be operated from a single relay module or control unit in the automated storage system.

In an aspect of the invention, the container handling vehicles may be arranged to transport the storage containers between the storage columns and the at least one relay module. The container handling vehicles may transport storage containers individually, or in some aspects the container handling vehicles may form a train like configuration to simultaneously retrieve/deposit and transport storage containers.

In an aspect of the invention, a plurality of relay modules may be arranged in series wherein the respective first conveyors of each of the plurality of relay modules cooperate to form a first continuous conveyor, and the respective second conveyors of each of the plurality of relay modules cooperate to form a second continuous conveyor. Advantageously, a plurality of relay modules each with their own port column may thus be coupled together for transferring goods via an access station. A plurality of storage containers may thus be continuously and/or simultaneously dropped off and picked up at the relay modules with minimal congestion problems. Furthermore, the continuous conveyors may act as a buffer zone holding containers as they are being transported to an access station. The continuous conveyors may preferentially comprise the conveyors of each relay module arranged in series. However, additional conveyors may be arranged between the conveyors of each relay module to allow for a greater distance between said relay modules. In aspects of the invention, the relay modules may be arranged adjacent to each other such that the port columns are arranged in a continuous line of grid cells in the track system. In further aspects of the invention, the relay modules may be spaced with any number of grid cells in between, and thus a conveyor may be arranged between the relay modules to form a continuous conveyor. Conveyors may thus be arranged to cover a distance of 0.5, 1 , 1.5, 2, 2.5, 3, 3.5, 4, . . . , 10, . . . , 15 grid cells in the rail system or more.

In an aspect, the sensors of each of the plurality relay modules may be signally connected to a control unit which tracks the position of storage containers along the continuous conveyors. Advantageously, storage containers may thus be transported to a certain port column, and the potential collision between storage containers being transported on a continuous conveyor and storage container being moved onto the conveyor by a lateral displacement device may be avoided.

In an aspect of the invention, the track system may comprise at least one transfer zone for temporarily storing storage containers when in transit between the plurality of storage columns and the at least one relay module, wherein the container handling vehicles are arranged to transport the storage containers between the storage columns and the at least one transfer zone.

The transfer zone is defined as a 2D area (in the Z and Y directions) on top of the rail system, i.e. the tracks, and the storage containers can be stored below the rail system or on top of the rail system from Z=0 to Z=X, where X is number of the lowermost storage position in the grid.

As compared to providing more ports to alleviate a congestion problem, it is easy to increase the number of transfer columns in the transfer zone in the rail system. Furthermore, the transfer columns in the transfer zone(s) can be located inside the track system, e.g. at a distance within the circumference of the track system, thus allowing the container handling vehicles access to the transfer columns from the X and Y directions. A port, on the other hand, is normally located at the circumference of the track system and, therefore, is normally only accessible from one direction. The transfer columns are preferably standard columns, and the location of the transfer zones with transfer columns in the track system can be computer operated, thereby the position of the transfer zone and thereby the transfer columns can be programmed to be at the most convenient location, and can be continuously changed. The transfer columns can be a row of 1, 2, 3, 4, 5 ,6, . . . , 10, . . . , 15 grid cells in the track system or more. A grid cell is the area defined by two pairs of opposing bars in the X and Y directions.

One transfer zone comprises a plurality of neighbouring individual transfer columns. The transfer columns can further be along more than one row, e.g. 2, 3 or more parallel rows, either neighbouring rows or not. The location of the transfer zone(s), i.e. the transfer columns, is thus preferably always temporarily. This renders possible freeing up area on the track system dependent on the operation of the container handling vehicles and or other vehicles moving on the rail system. For example, if a target storage container is below, i.e. for example at Z=8, and a temporarily transfer column is at Z=6, the transfer zone, and thereby the transfer column, can easily be relocated such that a container handling device can access the container at Z=8.

Furthermore, this temporarily location of the transfer zones, allows for flexibility and provides maximum storage capacity in the grid system.

It may be advantageous if the transfer columns form a transfer zone and the plurality of relay modules form a port zone, wherein the transfer zone is adjacent the port zone. Alternatively, the transfer zone may be arranged at a distance from the port zone.

In an aspect of the invention, container handling vehicles may be utilised to transport the storage containers between the storage columns and the transfer columns in the transfer zone.

In an aspect of the invention, container handling vehicles may be utilised to transport the storage containers between the transfer columns and the port columns of the relay modules. Advantageously, a train of container handling vehicles may arrive each with a storage container, to drop off and pick up storage container simultaneously at the port columns.

In an aspect of the invention, a port access vehicle may be arranged to transport the storage containers between the at least one transfer zone and the at least one relay module, on the track system or in a plane located above the track system. The port access vehicle may comprise a plurality of vehicle sections which are connected one after the other in a train-like configuration, which vehicle sections each being configured to carry at least one storage container, and a plurality of container lifting and holding devices enabling simultaneous transport of a plurality of storage containers between the transfer zone and the port zone comprising at least one relay module. A train-like configuration allows for the port access vehicle to be easily adapted to changing conditions in the track system. The port access vehicle may be operated on the track system, e.g. be arranged to travel along the track system of the grid. Alternatively, the port access vehicle may be operated on a monorail or double rail arranged in a parallel horizontal plane above the track system.

In an aspect of the invention, the access station may comprise:
- a picking station,
- a first conveyor and a second conveyor, arranged at a side of the picking station, and each adapted to be arranged in series with the first conveyor and the second conveyor respectively of a relay module to form a first continuous conveyor and a second continuous conveyor,
- a lateral displacement device arranged for transporting storage containers between the picking station and the first conveyor and the second conveyor.

Advantageously, the access station may thus comprise a similar construction as a relay module. However, an access station relay module may typically comprise panels covering the top, sides and ends of the relay module framework and a closable opening at the picking station for health and safety purposes. In aspects, the picking station may comprise an interface adapted for human interaction. In further aspects, the picking station may comprise an interface adapted for robot pickers, advantageously in such aspects, expensive health and safety requirements may be avoided. The conveyors and lateral displacement device of the access station relay module may comprise similar features and functionalities as for an aforementioned standard relay module.

The first conveyor and a second conveyor being arranged at a side of the picking station, may thus entail that they are arranged at a distance vertically and horizontally from the picking station. In aspects, the picking station may be arranged with two conveyors arranged at one side of the picking station, such that the lateral displacement device travels past the proximal conveyor to reach the distal conveyor. In aspect, the picking station may be arranged with two conveyors each arranged at transverse sides to the picking station, such that the lateral displacement device moves in either of the transverse directions to reach a conveyor.

In an aspect of the invention, the lateral displacement device may comprise an elevatable beam movable in a direction perpendicular to a transport direction of the first conveyor and the second conveyor. Preferably, a set of rails may extend across the first conveyor position, port station and second conveyor position such that the elevatable beams move along the rails. Each rail preferably being arranged between conveyors, such as between conveyor rolls and may also be arranged to pass through a slot in the conveyor railings. Beneath the set of rails a trolley may be arranged, the trolley being movable along the set of rails by a belt, wheels or any other means which will be familiar to the person skilled in the art. The trolley may further support the elevatable beams, with means for elevating the beams being arranged on the trolley such as an electric motor driving a lever, a hydraulic piston or any other lifting means which will be familiar to the person skilled in the art. Thus, the elevatable beams may be arranged to lift up at least one container, and move it between the second conveyor position, port station and first conveyor position. In other aspects of the invention, other means for lifting storage container may be used such as platforms, rods, pillars and other supporting means as will be apparent to the person skilled in the art based on the disclosure of the invention herein.

In an aspect of the invention, the elevatable beams may be arranged to simultaneously move two storage containers adjacent to each other. The elevatable beams may thus have a length sufficient to move a storage container from the second conveyor position to the port station, and move a storage container from the port station to the first conveyor position simultaneously.

In an aspect of the invention, the lateral displacement device may comprise a weighing mechanism. The weighing mechanism may comprise an electronic weighing mechanism as are known in the art. Advantageously, the weighing of containers on the lateral displacement device may provide a control unit of the automated storage system with information on where in the grid a storage container should be placed.

The invention further relates to a relay module for relaying storage containers between a port column and an access station, the relay module being adapted for arrangement below the port column, and wherein the relay module comprises;
- a port station for receiving storage containers dropped off from and to be picked up through the port column,
- a first conveyor and a second conveyor, arranged at a side of the port station,
- the first conveyor being adapted to transport storage containers to an access station,
- the second conveyor being adapted for transporting storage containers from the access station,
- a lateral displacement device that is arranged for transporting storage containers between the port station and the first conveyor, and between the second conveyor and the port station.

In an aspect of the invention, the lateral displacement device may comprise elevatable beams movable in a direction perpendicular to a transport direction of the first conveyor and the second conveyor.

The first conveyor and a second conveyor being arranged at a side of the port station, may thus entail that they are arranged at a distance vertically and horizontally from the port station. In aspects, the port station may be arranged with two conveyors arranged at one side of the port station, such that the lateral displacement device travels past the proximal conveyor to reach the distal conveyor. In aspect, the port station may be arranged with two conveyors each arranged at transverse sides to the port station, such that the lateral displacement device moves in either of the transverse directions to reach a conveyor.

In an aspect of the invention, the elevatable beams may be arranged to simultaneously move two storage containers adjacent to each other.

In an aspect of the invention, the lateral displacement device may comprise a weighing mechanism.

The invention further relates to a method of operating an automated storage and retrieval system, the automated storage and retrieval system comprising:
  a track system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each comprising a grid opening defined by a pair of neighbouring tracks of the first set of tracks and a pair of neighbouring tracks of the second set of tracks;
  a plurality of stacks of storage containers arranged in storage columns located beneath the track system, wherein each storage column is located vertically below a grid opening;
  a plurality of container handling vehicles for lifting and moving storage containers stacked in the stacks, each container handling vehicle being configured to move on the track system above the storage columns,
  at least one relay module comprising; one port station arranged at a lower end of a port column, a first conveyor and a second conveyor arranged at a side of the port station and a lateral displacement device arranged for transporting storage containers between the port station and the first conveyor, and between the second conveyor and the port station, wherein the method comprises:
  transporting the storage containers between the storage columns and the port column; and
  utilising the lateral displacement device, transporting storage containers from the port station to the first conveyor, and transporting storage containers from the second conveyor to the port station,
  utilising the first conveyor, transporting storage containers from the relay module to an access station; and
  utilising the second conveyor, transporting storage containers from the access station to the relay module.

Thus, the storage containers are moved in loop between the relay module and access station, ensuring that storage containers may be deposited and retrieved through the same column. The first conveyor and a second conveyor being arranged at a side of the port station, may thus entail that they are arranged at a distance vertically and horizontally from the port station. In aspects, the port station may be arranged with two conveyors arranged at one side of the port station, such that the lateral displacement device travels past the proximal conveyor to reach the distal conveyor. In aspect, the port station may be arranged with two conveyors each arranged at transverse sides to the port station, such that the lateral displacement device moves in either of the transverse directions to reach a conveyor.

In an aspect of the invention, method may further comprise the steps of:
  utilising the lateral displacement device to transport a storage container from the port station to the first conveyor whilst simultaneously transporting another storage container from the second conveyor to the port station.

In an aspect of the invention, the method may further comprise the steps of transporting storage containers between the storage columns and the port column by utilising the container handling vehicles.

In an aspect of the invention, the method may further comprise the steps of:
  arranging in the track system, a plurality of relay modules and adjoining the first conveyors and the second conveyors in series such that the first conveyors form a first continuous conveyor, and the second conveyors form a second continuous conveyor.

In an aspect of the invention, the method may further comprise the steps of:
  operating a control system to define at least one transfer zone for temporarily storing storage containers when in transit between the storage columns and the plurality of relay modules,
  utilizing container handling vehicles which are operated on the track system for retrieving storage containers from and storing storage containers in the transfer zone and for transporting the storage containers horizontally across the track system; and
  wherein the step of transporting the storage containers between the transfer zone and the plurality of relay modules comprises utilizing a port access vehicle, which port access vehicle is configured to carry a plurality of storage containers, and where the port access vehicle is operated on the track system or in a horizontal plane which is located above the horizontal plane of the track system.

A port access vehicle may comprises a plurality of vehicle sections which are connected one after the other in a train-like configuration, which vehicle sections each being configured to carry at least one storage container, and a plurality of container lifting and holding devices enabling simultaneous transport of a plurality of storage containers between a transfer zone and a plurality of relay modules, and wherein the port access vehicle may be arranged to transport the storage containers between the transfer zone and the plurality of relay modules in a plane located above the rail system. The train-like configuration allows for the port access vehicle to be easily adapted to changing conditions in the grid or track system. The port access vehicle may be operated on the track system, e.g. be arranged to travel along the track system of the grid. Alternatively, the port access vehicle may be operated on a monorail or double rail arranged in a parallel horizontal plane above the track system.

A control system may typically be computerised and comprise database for keeping track of the storage containers.

In an aspect of the invention, the method further comprises the steps of:
  providing an access station outside the grid, the access station comprising a picking station, a first conveyor and a second conveyor each arranged on opposite sides of the picking station and a lateral displacement device arranged for transporting storage containers between the picking station and the first conveyor and the second conveyor, arranged the first conveyor and the second conveyor of the access station with a first conveyor and a second conveyor of a relay module forming a first continuous conveyor and a second continuous conveyor.

The term 'lateral' used herein may mean 'horizontal'.

In the following description, numerous specific details are introduced by way of example only to provide a thorough understanding of embodiments of the claimed system and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF DRAWINGS

Following drawings are appended to facilitate the understanding of the invention.

FIG. 9A and 9B are perspective views of sequences of operation of a relay module beneath a track system, and with a relay module access station.

FIG. 10A and 10B are perspective views of further sequences of operation of a relay module beneath a track system.

FIG. 11A and 11B are perspective views of yet further sequences of operation of a relay module beneath a track system.

FIG. 12 is a perspective view of a plurality of relay modules arranged in series, their conveyors forming a first continuous conveyor and a second continuous conveyor.

In the drawings, like reference numerals have been used to indicate like parts, elements or features unless otherwise explicitly stated or implicitly understood from the context.

DETAILED DESCRIPTION

Figure 1:
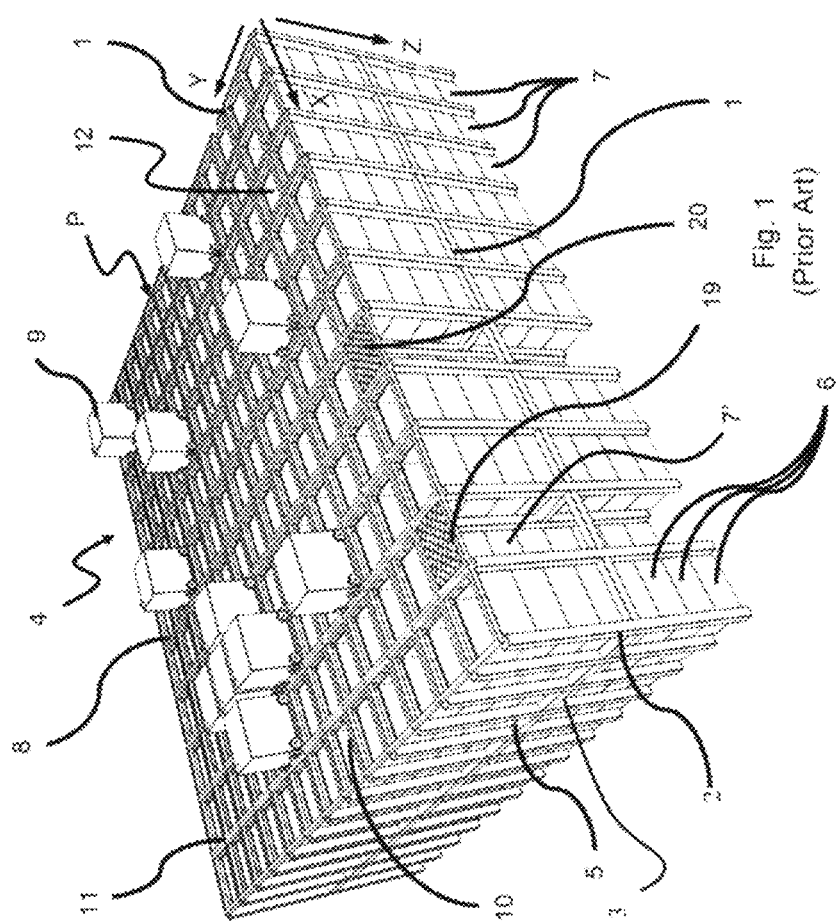
FIG. 1 is a perspective view of a grid of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Furthermore, even if some of the features are described in relation to the system only, it is apparent that they are valid for the method and the relay module as well, and vice versa, i.e. any features described in relation to the method only are also valid for the system and relay module.

Figure 5:
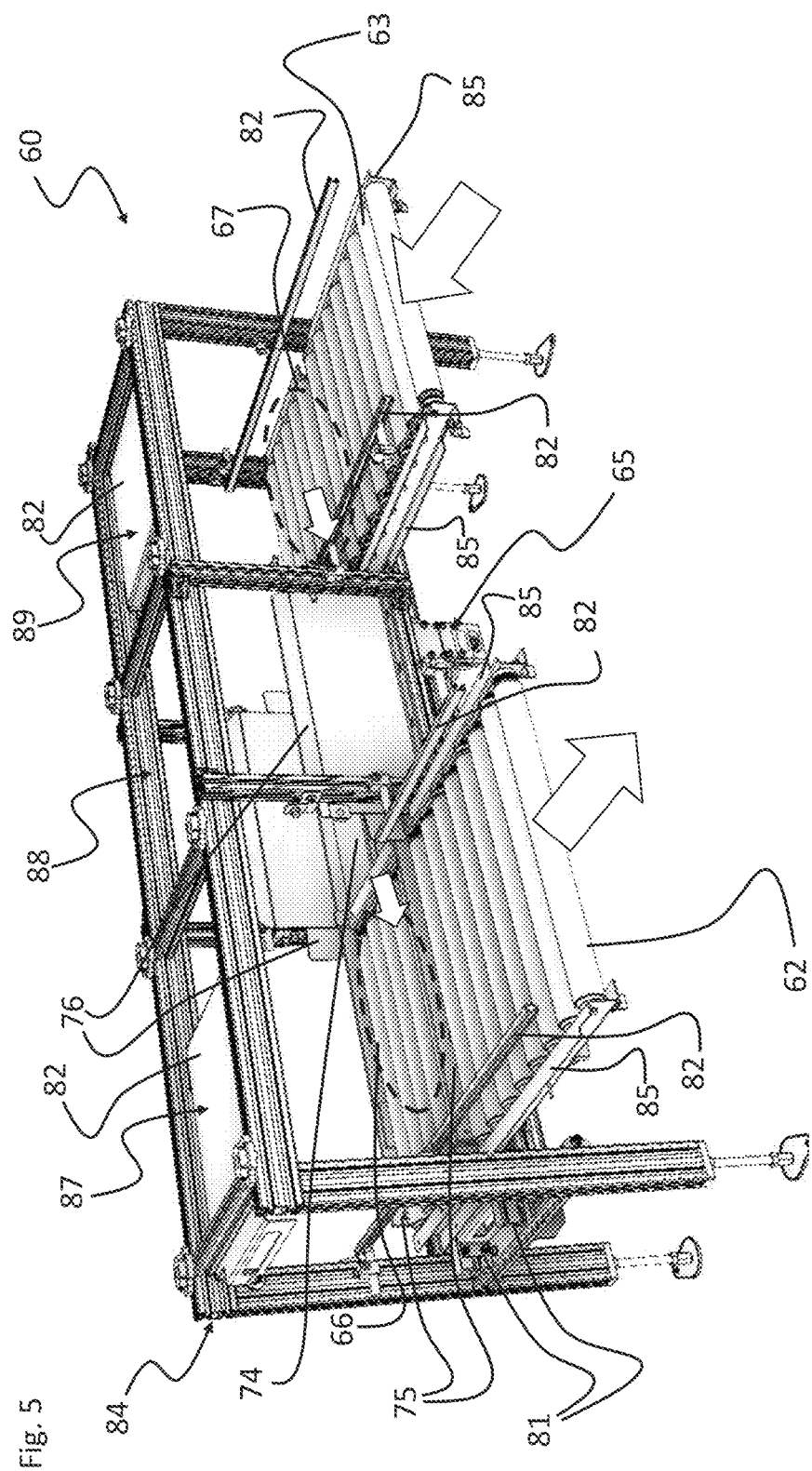
FIG. 5 is a perspective view of a relay module according to an aspect of the invention.

FIG. 5 is a perspective view of a single relay module 60. The relay module 60 may comprise framework 84 similar to that which is used in the framework structure of the grid 4, such as extruded aluminium profiles. The framework 84 may contain electric cabling for powering and controlling the different functionalities of the relay module 60. Though not illustrated in the Figures, a control unit panel with means for supplying power and control can be placed on the distal end of a relay module 60, where it is easily accessible for an operator. Each relay module 60 is typically manufactured independently, and can be installed in an automated storage and retrieval system with minimal modification.

The framework 84 of the relay module 60 is exemplified as occupying the space of three consecutive grid cells 12. The middle grid cell 88 is adapted for arrangement to a lower end of a port column 61 such that storage containers 6 can be lifted down or up through the middle grid cell 88 and onto or from an elevatable platform of a lateral displacement device 65. A first grid cell 87 and a second grid cell 89 are located on either side of the middle grid cell 88, and are each located above a first conveyor 62 and a second conveyor 63 respectively. Dashed ellipses marked below the first grid cell 87 and second grid cell 89 represent a first conveyor position 66 and a second conveyor position 67. As indicated by the smaller arrows in FIG. 5, the lateral displacement device 65 is adapted to move storage containers 6 between the first conveyor position 66, the second conveyor position 67 and a port station 74. The port station in FIG. 5 is located below the intermediate grid cell, and may be defined as a position on the relay module arranged to receive storage containers dropped off from and to be picked up through the port column. The larger arrows in FIG. 5 represent the transport directions of the first conveyor 62 and the second conveyor 63, as they respectively transport storage containers 6 from the first conveyor position 66 to an access station 64, and from the access station 64 to the second conveyor position 67.

The conveyors 62, 63 in the Figures are exemplified as transport rolls with integrated motors mounted between conveyor railings 85. The conveyors 62,63 are in the aspect of FIG. 5 exemplified as extending a distance beyond the first and second grid cells 87,89. For a single relay module 60 the distance the conveyors 62,63 extend beyond the first grid cell 87 and second grid cell 89 is typically equal to the length of one grid cell. Thus, the relay module in FIG. 5 has a footprint of 3×2 grid cells. A plurality of relay modules 60 according to a similar aspect as in FIG. 5 are illustrated in arranged in series in FIGS. 10A-B and FIGS. 11A-B. The extended conveyors 62,63 leave a space of one grid cell between each relay module 60, thus facilitating access for operators to the continuous conveyors 62,63.

Figure 15:
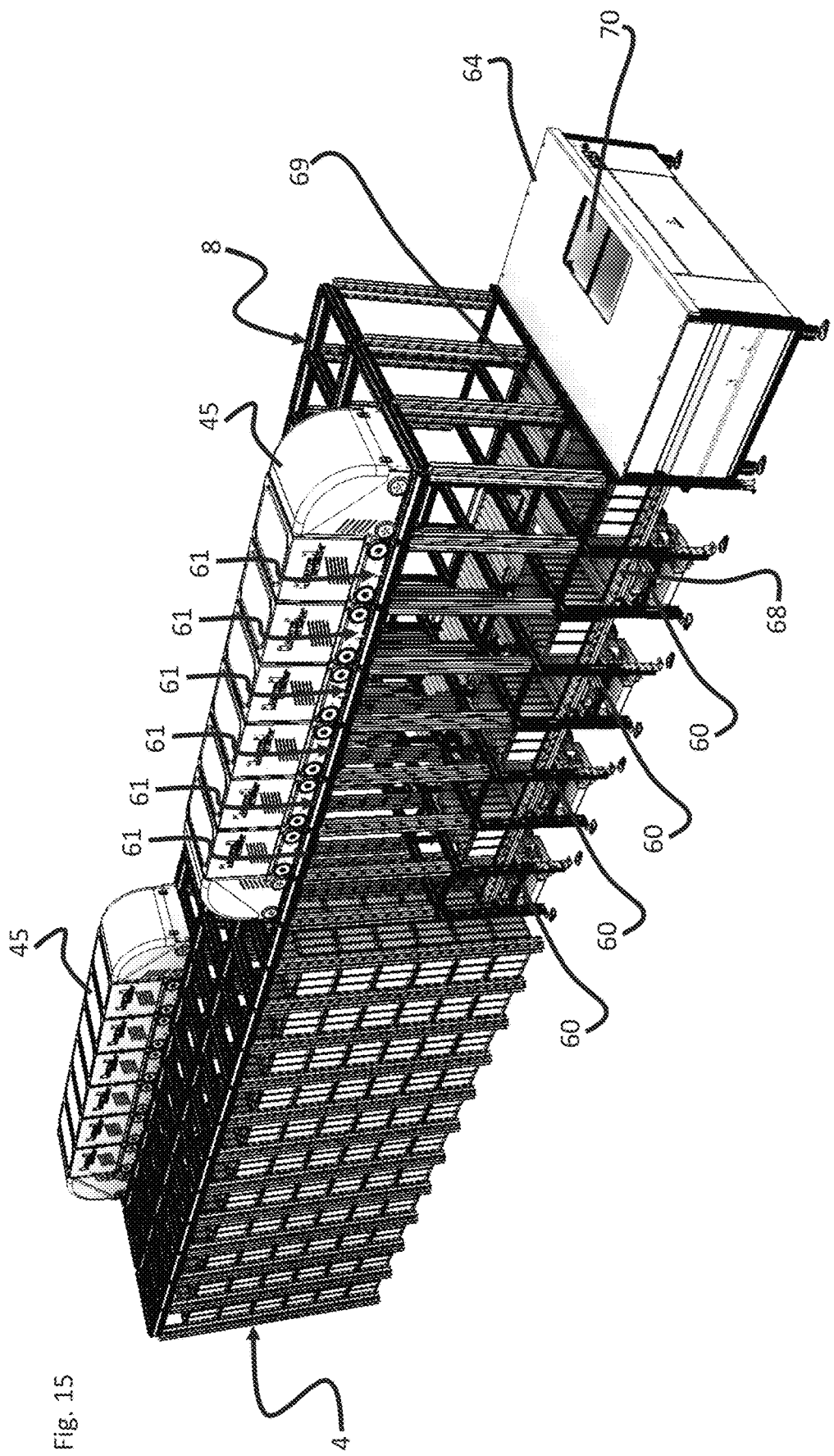
FIG. 15 is a perspective view of two port access vehicles on a track system over a plurality of relay modules.
Figure 16:
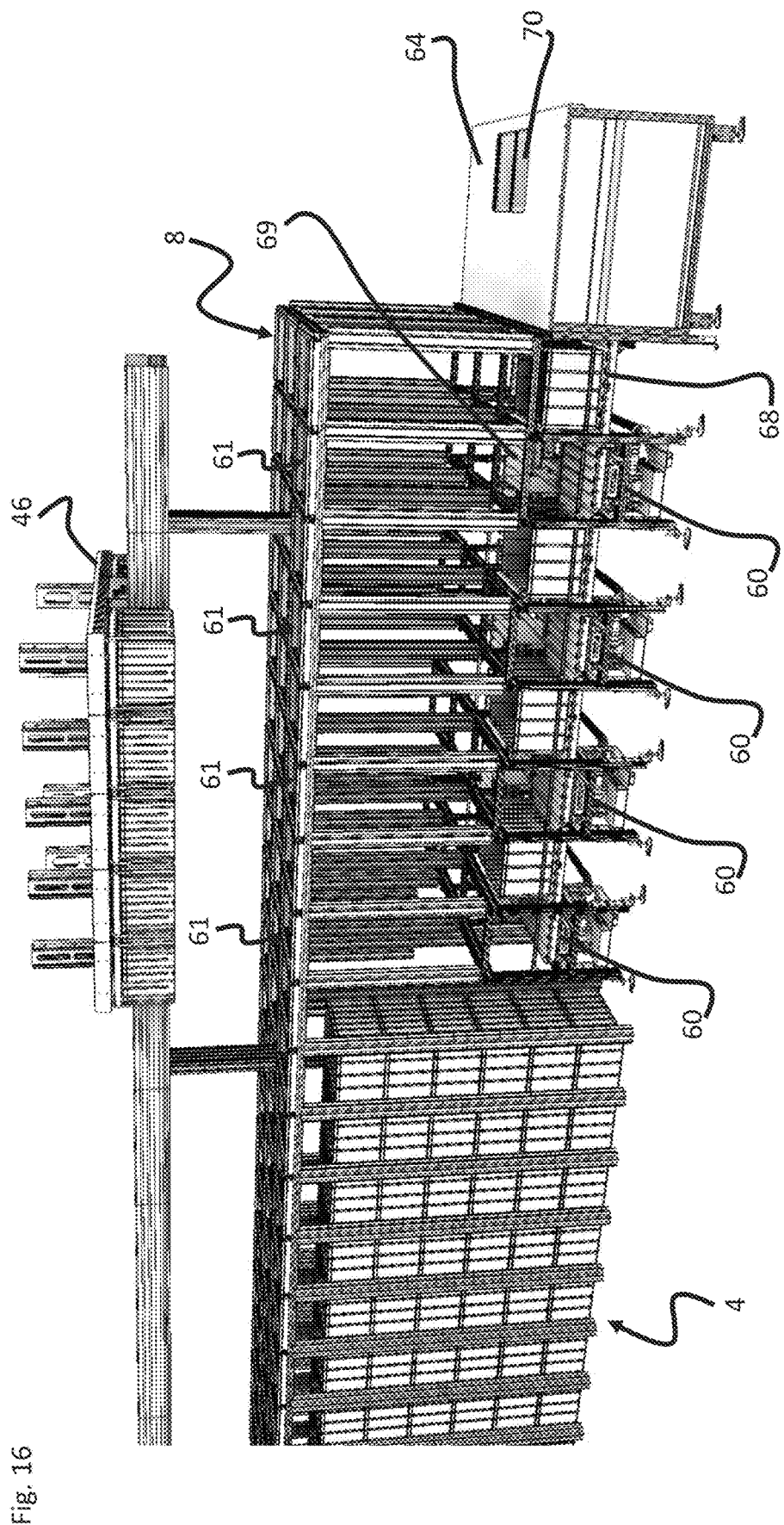
FIG. 16 is a perspective view of another aspect of a port access vehicle on a track system over a plurality of relay modules.

FIG. 5 further shows guiding plates 76 arranged on each side of the port station 74 to guide the storage containers 6 to an aligned orientation as they are lifted down through the port column 61 and onto a lateral displacement device 65. Guiding plates 76 are also arranged to guide storage containers 6 being moved between the conveyors 62,63 and the port station 74. The storage containers 6 are thus aligned in the port station 74, facilitating the engagement of a lifting device 16 to retrieve said containers. Guiding fences 82 are also illustrated on each side of the conveyors 62,63, to keep storage containers 6 in a fixed direction as they are being conveyed. The relay module in FIG. 5 is also exemplified with an aspect where blocking panels 83 are mounted in the first grid cell 87 and the second grid cell 89, these panels hinder falling objects dropping onto the conveyors 62,63, or storage containers 6 from mistakenly being lowered directly onto a conveyor 62,63 from the track system 8 above. In aspects of the invention, a port column 61 may be allocated above any of the first grid cell 87 and/or the second grid cell 89, whereby storage containers 6 are lowered directly on to the conveyors 62,63. In other aspects of the invention, such as illustrated in FIGS. 15 and 16, any of the first grid cell 87, second grid cell 88 or middle grid cell 89 may be arranged at a lower end of a port column 61. Therefore, as the skilled person will appreciate, the use of blocking panels 83 is dependent on these aspects.

Figure 6:
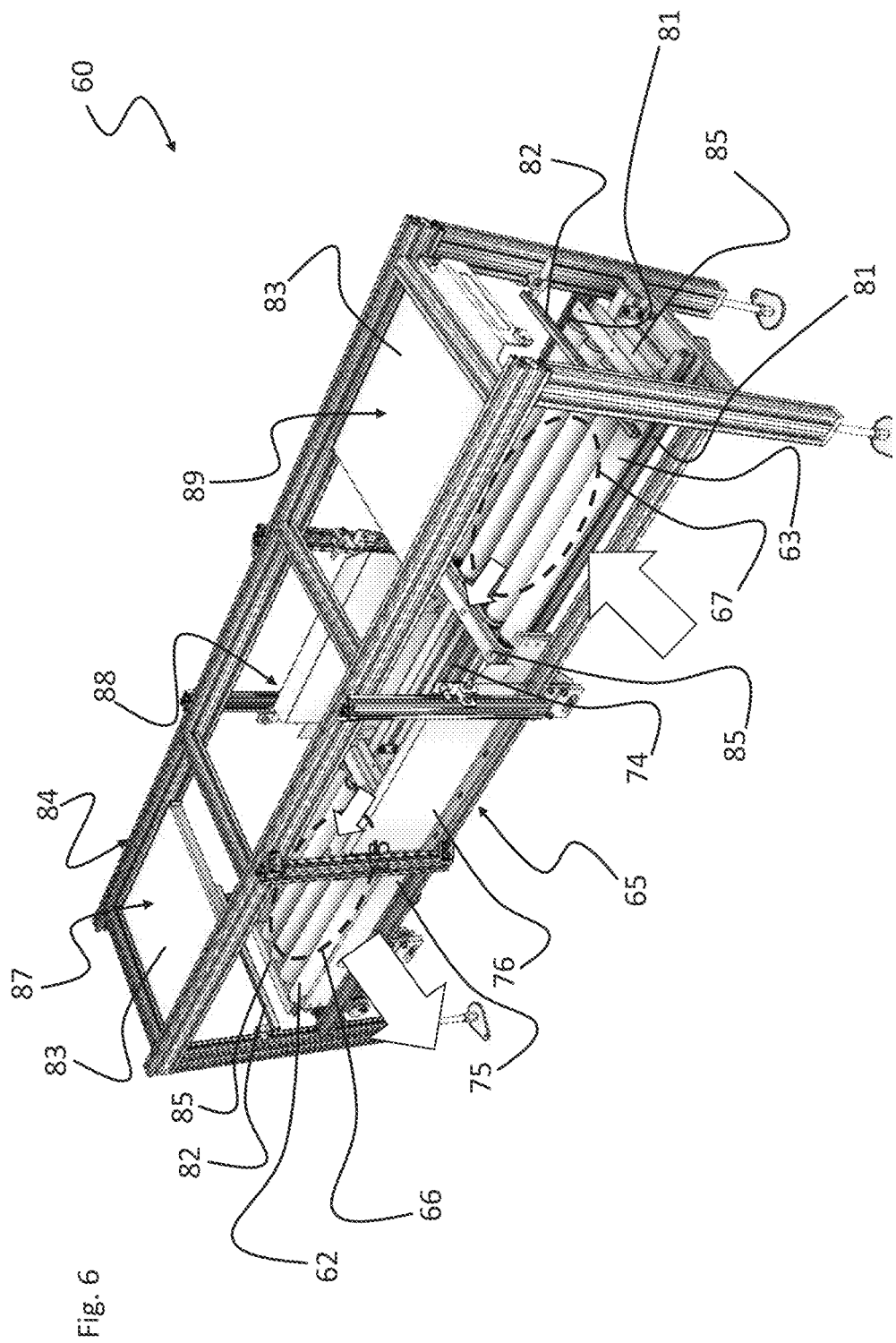
FIG. 6 is another perspective view of a relay module according to an aspect of the invention.

FIG. 6 illustrates an aspect of the invention, where a relay module 60 is shown in another perspective view from that of FIG. 5. The relay module in FIG. 6 illustrates similar features as in FIG. 5, however the conveyors 62,63 do not extend beyond the first grid cell 87 and second grid cell 89 and thus only occupy 3×1 grid cells.

Several aspects of a lateral displacement device 65, are also exemplified in FIGS. 5-8. The rails 81, on which the lateral displacement device 65 is mounted are shown at one distal end of the relay module 60 beneath the first conveyor 62 in FIG. 5. Whilst the other distal end of the relay module 60 is illustrated in the perspective in FIG. 6, where the rails 81 are shown beneath the second conveyor 63. Thus, the rails 81 extend the length of the relay module 60, and are arranged between conveyor rolls, such that a rail mounted trolley 71, illustrated in FIGS. 7 and 8, can move along the rails 81. Slots are shown in the conveyor railings 85 in FIG. 5, these slots being arranged to allow lifting beams 75 on the trolley 71 to move laterally along the relay module 60 and past the conveyors 62,63. The lifting beams 75 are shown in a raised position above the first conveyor 62 and port station 74 in FIGS. 5 and 6.

Figure 7:
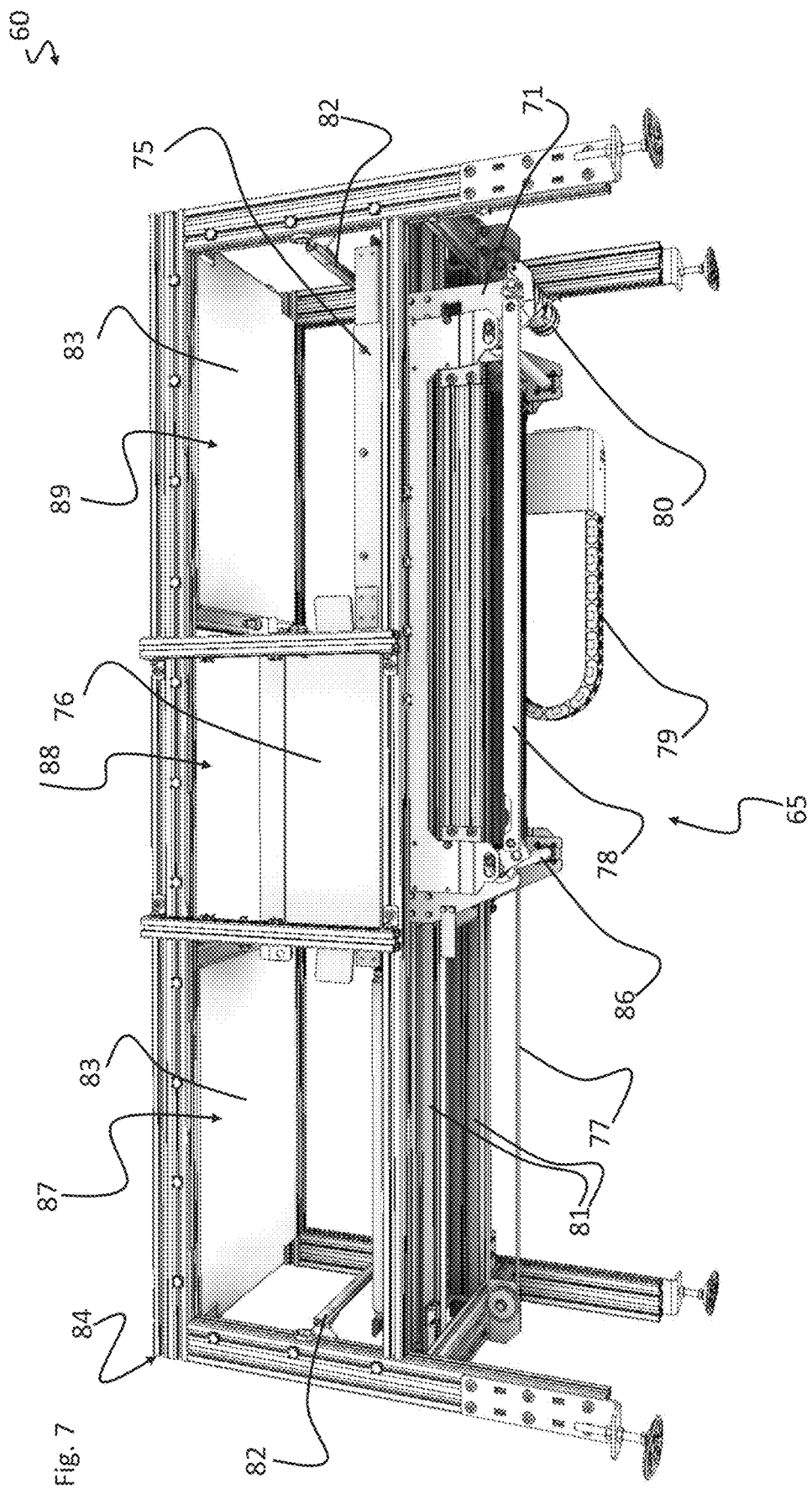
FIG. 7 is a perspective view of a relay module according to an aspect of the invention, illustrating details of a lateral displacement device in a raised position.
Figure 8:
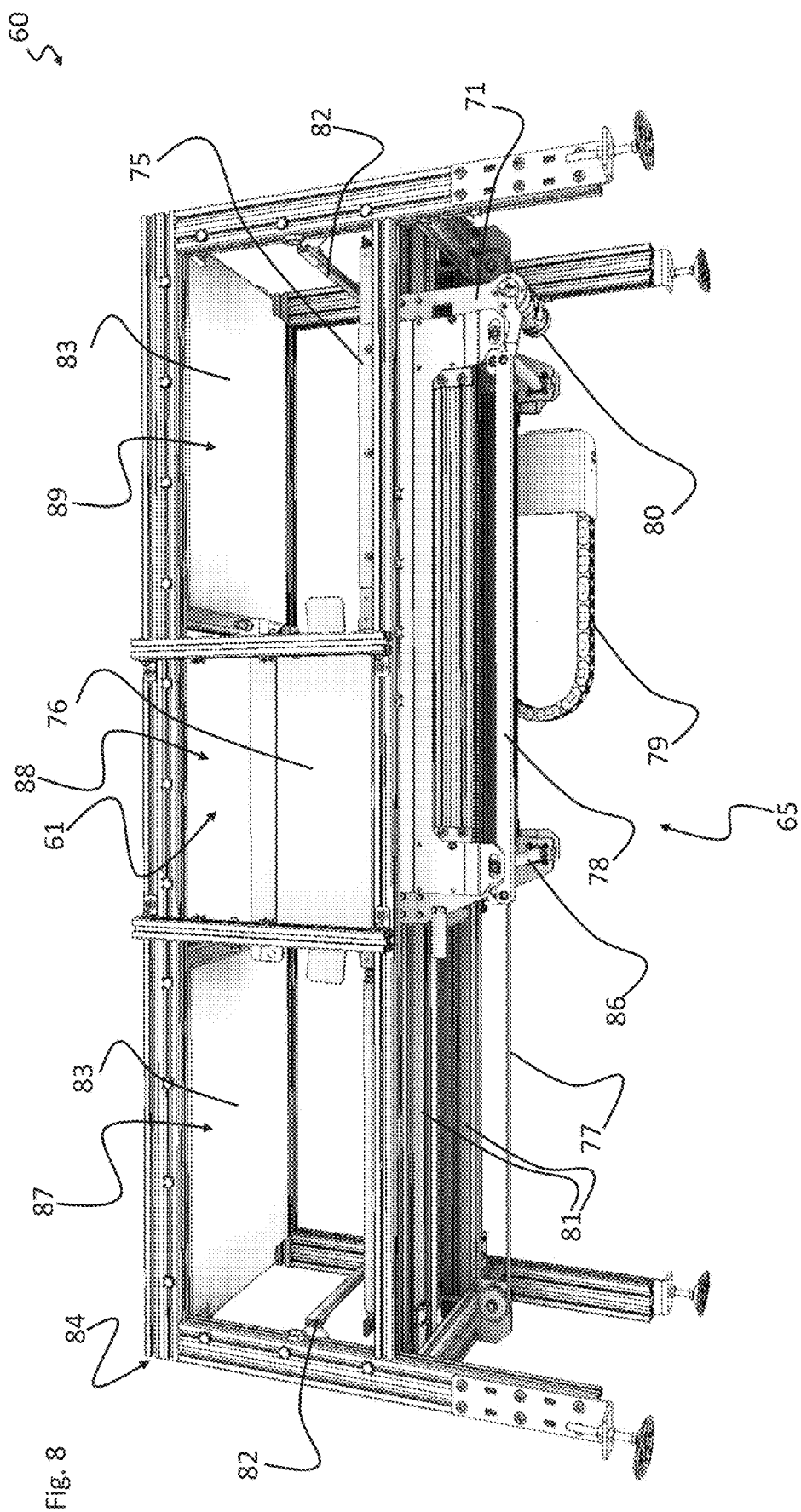
FIG. 8 a perspective view of a relay module according to an aspect of the invention, illustrating details of a lateral displacement device in a lower position.

FIG. 7 and FIG. 8 illustrate the relay module 60 from yet another perspective, showing the lateral displacement device 65 in further detail. In these figures, the rails 81 can be seen extending beneath the conveyors 62,63 along the length of the relay module 60. The rail mounted trolley 71 is illustrated mounted on the rails 81 beneath the middle grid cell 88 and the second grid cell 89, and thus has a length which may be suitable for the simultaneous lifting of two storage containers 6. A driving belt 77 is also shown extending along the length of the relay module 60, with pulleys on each end. Though not shown, the driving belt is fixed to the trolley 71, and is thus arranged to move said trolley 71 along the rails 81. An electric motor, or similar driving means may be arranged in connection with one of the pulleys or on the trolley 71 to move said trolley along the rails 81. A guiding chain 79 is connected between the trolley 71 and the framework of the relay module, the guiding chain 79 containing cables for supplying electric power, control and communications to the trolley 71 whilst protecting and holding in place said cables as the trolley 71 is moved back and forth along the rails 81. The cables are typically connected to weighing means and other sensor means on the trolley, not shown, and a lifting motor 80.

The lifting motor 80 typically comprises an electric motor which is mechanically connected to a lifting rod 78 which extends along the trolley 71 and is coupled to two lifting shafts 86 which extend across the trolley as illustrated in FIG. 7 and FIG. 8. The lifting beams 75 are mounted on cams on the end of the lifting shafts 86, and the rotation of the liftings shafts thus raises or lowers the lifting beams 75. However, as will be apparent to the person skilled in the art based on the description of the invention here, many other kinds of liftings mechanisms may be used. FIG. 7 illustrates the lifting beams 75 in a raised position, where the beams 75 extends above the conveyor rolls as in FIGS. 5 and 6. The raised position of the lifting beams 75 being used when the storage containers 6 are to be transported between positions in the relay module 60. In the raised position, the lifting motor 80 is illustrated with the lifting rod 78 pulled towards the right of FIG. 7 such that a cam on the lifting shaft 86 is in a raised position, pushing the lifting beams 75 over the conveyors 62,63. In contrast FIG. 8 illustrates a similar aspect of the invention as in FIG. 7, from a similar perspective, but with the lifting beams 75 in a lower position. The lifting motor 80 in FIG. 8 has rotated the lifting rod towards the left in the Figure, such that the cam on the lifting shaft 86 is in a lower position . The lower position of the lifting beams 75 being used to move the trolley beneath the conveyors 62,63 and port station 74 without colliding with or carrying storage containers 6.

The relay module 60 illustrated in FIGS. 5-8, may also be modified for use as an access station 64. By covering an access station relay module 64 with covering plates, as illustrated in FIGS. 9A-11B, 13, 15 and 16, the relay module 60 may be used as a human interface. In other aspects, not illustrated herein, an access station relay module 64 can have varying degrees of plating depending on factors such as health and safety requirements.

As illustrated in FIGS. 9A-11B, 13, 15 and 16, the access station relay module 64 is typically arranged with a relay module 60 located in the track system 8, such that the first conveyors 62 and second conveyors 63 of the relay modules 60 respectively form first continuous conveyor 68 and a second continuous conveyor 69. In these aspects, the port station 74 of the access station relay module 64 acts as a picking station 70, where objects are picked from and placed into the storage container 6 currently located at the picking station 70. The lateral displacement device 65 transports storage containers 6 from the first continuous conveyor 68 to the picking station 70, and transports storage containers 6 from the picking station 70 to the second continuous container 69.

A sequence of operating a relay module 60 and a relay module access station 64 according to an aspect of the invention, installed in an automated storage and retrieval system will be described in the following with reference to FIGS. 9A-11B. However, it will be clear to the person skilled in the art, that a similar sequence of operating a relay module 60 applies to other aspects of the invention and any form of access station 64 may be used, also that a similar sequence may apply for a plurality of relay modules 60 arranged in series.

Figure 2:
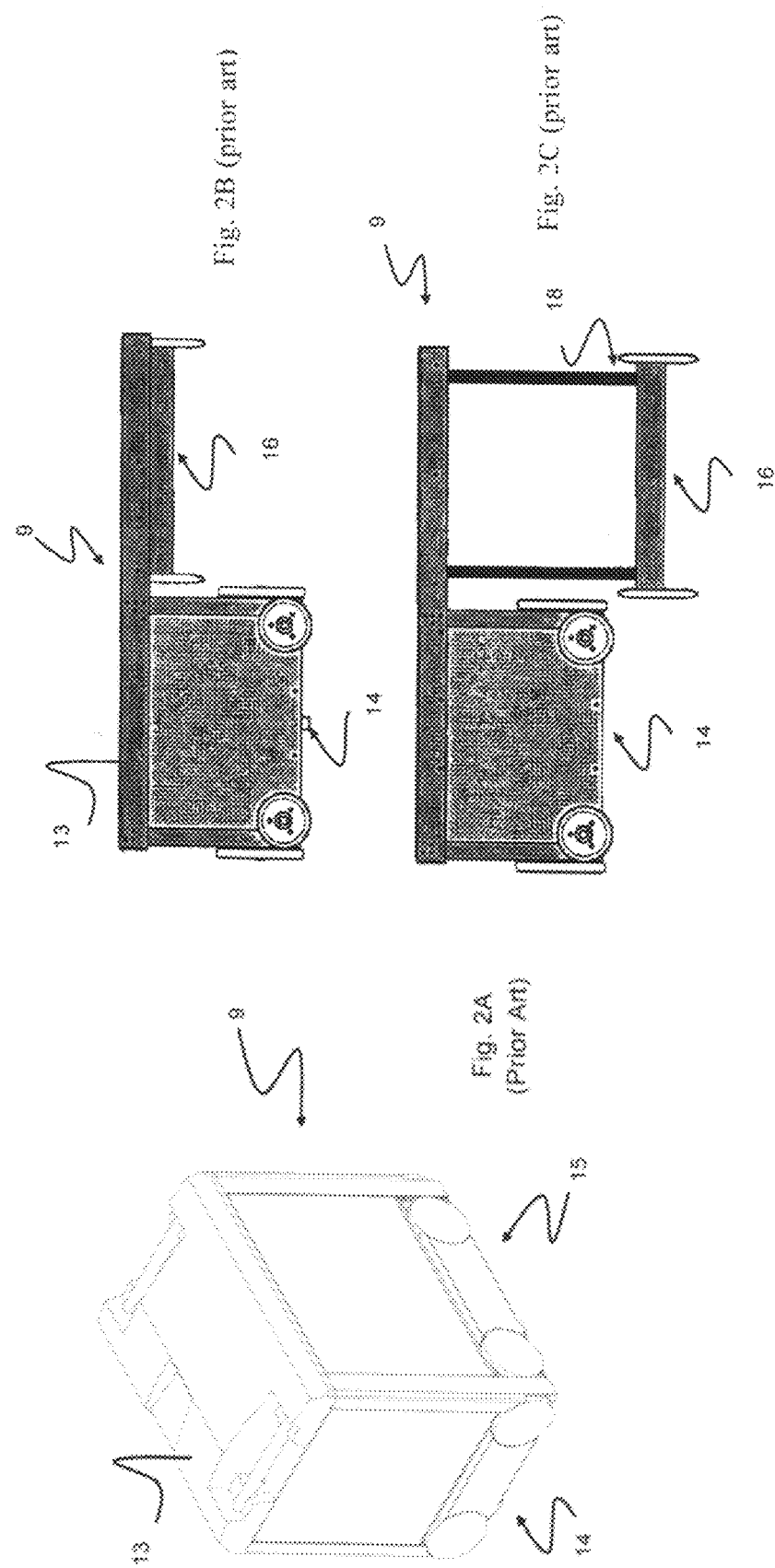
FIG. 2A-2C are perspective views of prior arts container handling vehicle.
Figure 3:
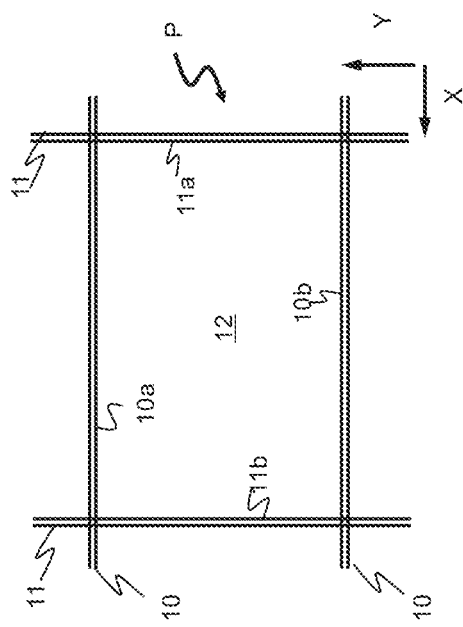
FIG. 3 is a top view of a prior art single rail grid.
Figure 4:
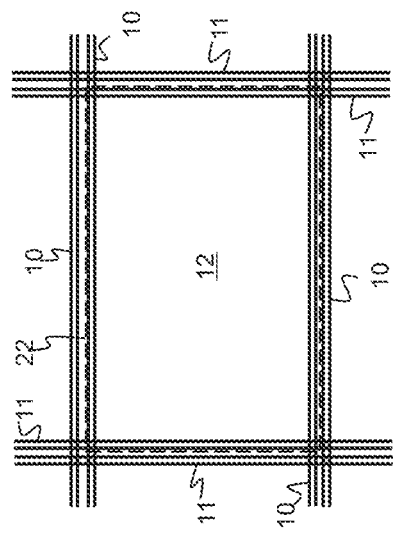
FIG. 4 is a top view of a prior art double rail grid.

An aspect of the invention is exemplified in these Figures with respect to a container handling vehicle 9 as illustrated in FIG. 2B and FIG. 2C, however, it will be clear to the person skilled in the art that the container handling vehicle 9 illustrated in FIG. 2A may also be used, or any other container handling vehicle 9 operating on or above the track system 8.

FIGS. 9A-11B illustrate one relay module 60 arranged at a lower end of three grid columns 12 of a track system 8. As illustrated in FIGS. 13-17, the at least one relay module 60 typically comprises part of, or is arranged adjoining, to a storage grid 4. In FIGS. 9A-11B, the relay module 60 is arranged with an access station relay module 64 which is located on the outside of the track system 8. The conveyors of the relay module 60, and the access station relay module 64 each form continuous conveyors 68,69, thus allowing for the transport of storage containers 6 between the two. The transport direction of the conveyors 68,69, and transport direction of the lateral displacement devices 65 is illustrated by the arrows forming a loop. The embodiment in FIGS. 9A-11B is exemplified with a port column 61 arranged above the port station of the relay modules, and storage containers 6 are deposited on to and retrieved from said port station 74. However, it will be apparent to the person skilled in the art based on the disclosure of the invention herein, that storage containers 6 may also be deposited and retrieved directly from a container handling device 9 on the track system 8 on to either of the conveyors 68,69 on each side of the port station 74. In such aspects, a similar sequence as will be described in the following is applied, although port columns 61 may be on either side of the port station 74.

In FIG. 9A, a container handling vehicle 9 retaining a storage container 6 is illustrated on the track system 8, with the storage container 6 located above the port column 61 and the port station 74 of the relay module 60. The storage container 6 which is held by container handling vehicle 9 may have been brought from a column elsewhere in the system, typically a storage column 5. FIG. 9A further illustrates a storage container 6 located on the second conveyor position 67, and a storage container 6 in the picking station 70. Though not visible in FIGS. 9A-11B, the access station relay module 64 may contain a storage container 6 on one side of the picking station 70, either recently arrived on the first continuous conveyor 68 from the relay module 60, or recently moved from the picking station 70 to the second continuous conveyor 69.

The arrow pointing down from the container handling vehicle 9 represents the direction of travel for the storage container 6, which is to be lowered down through the port column 61 and to the port station 74. FIG. 9B illustrates a storage container 9 as it is being lowered to the port station 74 by the lifting device 16 of the container handling vehicle 9. The guiding panels 76 ensure that the storage container 9 is brought down to the port station 74 in an aligned orientation. After the storage container 9 is securely placed at the port station 74, the lifting device 16 releases its engagement with the storage container 9. Whereupon the lifting device 16 is raised to a safe distance above the storage container 9 at the port station 74 as illustrated by the arrow in FIG. 10A. The lifting device 16 is preferably not fully withdrawn to the container handling vehicle 9, but can await a new storage container 9 in the safe distance in the port column 61 above the port station 74.

Once the lifting device 16 has been withdrawn to a safe distance, the storage container 9 in the port station 74 and the storage container 9 in the second conveyor position 67 are lifted by the elevatable beams 75 of the lateral displacement device 75. The storage containers 6 are then simultaneously transported one grid cell, in the direction of the arrows, resulting in the shift illustrated in FIG. 10B. Thus, the storage container 6 from the port station 74 is moved to the first conveyor position 66, and the storage container 6 from the second conveyor position 67 is moved to the port station 74.

Meanwhile, a similar shift of storage containers 6 typically occurs in the access station relay module 64, where at least one storage container 6 is moved from or to the picking station 70 in the direction marked by the arrows.

By virtue of the guiding plates 76, the storage container 6 is moved in to the port station, shown in FIG. 10B, in an orientation where it is prepared for engagement with the lifting device 16 of the container handling vehicle 9 on the track system 8 above. The lifting device 16 is lowered to the storage container 6 to which it engages, illustrated by the arrow over the lifting device 16 in FIG. 10B. The lifting device 16 is illustrated in FIG. 11A engaged with the storage container 6 in the port station 74. Thereafter, the storage container 6 on the first continuous conveyor 68 is transported to the access station 64, and another storage container 6 is transported from the access station 64 along the second continuous conveyor 69 to the second conveyor position 67, the result illustrated in FIG. 11B. Meanwhile, the storage container 6 in the port station 74 is lifted by the lifting device 16 up to the container handling vehicle 9, which may then transport the storage container 6 to a column in the grid 4. Another container handling vehicle 9 can then access the port column 61, as in FIG. 9A, repeating the sequence.

Figure 13:
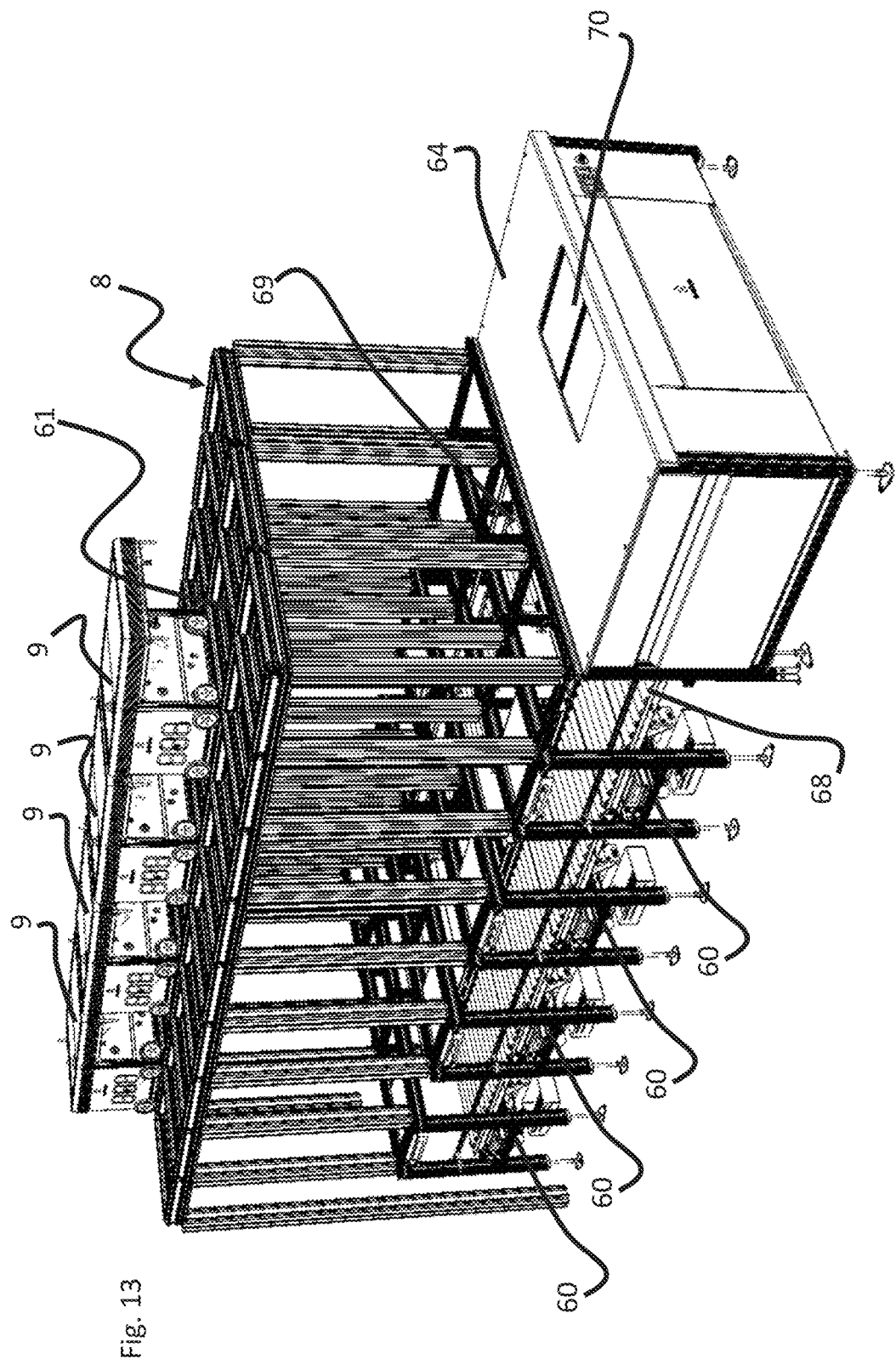
FIG. 13 is a perspective view of a plurality of relay modules arranged in series beneath a track system and with a plurality of container handling vehicles on the track system.

FIG. 12 illustrates an aspect of the invention, where a plurality of relay modules 60 are arranged in series, the first conveyors 62 and second conveyors 63 forming a first continuous conveyor 68 and second continuous conveyor 69 respectively. The large arrows at the end of the continuous conveyors 68,69 illustrate their transport direction. Each relay module 60 comprises an extended conveyor, similar to the aspect illustrated in FIG. 5, such that a space of one grid cell is left between each relay module 60. The space between each relay module 60 allows for easier access by an operator. The smaller arrows illustrate the transport direction of the lateral displacement device 65 of the relay modules 60. A similar aspect to FIG. 12 is illustrated in FIG. 13, where a series of relay modules 60 are arranged below a track system 8, and with a relay module access station 64 located outside the track system 8. Furthermore, FIG. 13 illustrates four container handling vehicles 9, according to the aspect in FIG. 2B and 2C located on the track system 8 in a train like configuration, where each container handling device 9 is oriented with its lifting device 16 over a port column 61 of a relay module 60.

In some aspects of the invention, a plurality of container handling vehicles 9 may arrive in a train like configuration as illustrated in FIG. 13, however, the container handling vehicles 9 may also arrive independently in to such a configuration.

Since container handling vehicles 9 may arrive at a port column 61 independently, the dropping off and picking up of storage containers 6 at relay modules 60 arranged in series as in FIG. 13 is not necessarily synchronized. Each relay module 60 may therefore comprise sensors to detect when a storage container 6 is in the second conveyor position 67, and when there is space on the first continuous conveyor 68 to move a storage container 6 to the first conveyor position 66. The control units of the relay modules 60 may also be connected to synchronize the movement of the lateral displacement devices 65. By being able to synchronize the lateral displacement devices 65, an optimal sequence of moving storage containers 6 between the conveyors 68,69 and port stations 74 can be achieved where storage containers 6 are simultaneously moved across the different positions of the relay modules 60, minimizing risk of collisions.

Figure 14:
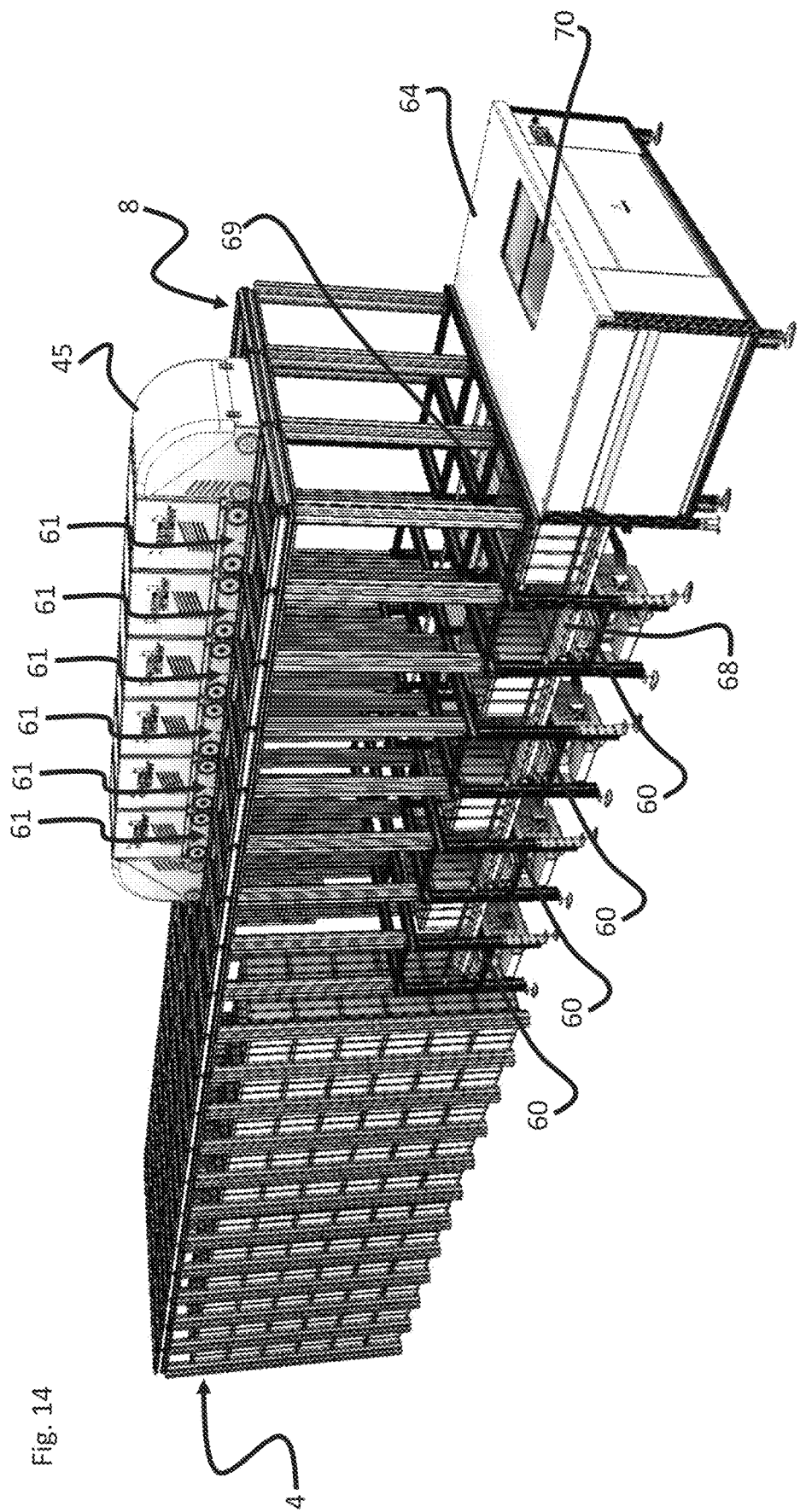
FIG. 14 is a perspective view of an aspect of a port access vehicle on a track system over a plurality of relay modules.

FIG. 14 illustrates an aspect of the invention, where a port access vehicle 46 comprising a multi-trolley vehicle 45 is shown on the track system 8 above a plurality of relay modules 60 arranged in series. The relay modules 60 in FIG. 14 are arranged with an access station 64 arranged outside the track system 8. A multi-trolley vehicle 45 as illustrated in FIG. 14 is arranged to travel rectilinearly on or above the track system 8 along at least one row 40 of said grid column. The multi-trolley vehicle 45 in FIG. 14 comprises drive vehicles arranged at each end of a trolley assembly comprising a plurality of trolleys. The trolleys comprise lifting devices, such that they may lift a storage container 6 and retain it within the body of the trolley as the vehicle is moved along the track system 8.

In the aspect illustrated in FIG. 14, the multi-trolley vehicle 45 is arranged to travel along the row comprising the port columns 61 above the serially arranged relay modules 60. Thus, the port access vehicle 45 can retrieve a number of storage containers 6 from columns arranged in the grid 4 along the same row on the track system 8 as the port columns 61, where the storage containers 6 may be simultaneously deposited and retrieved. The relay modules 60 will thus be operated in a similar sequence as described for FIGS. 9A-11B; the storage containers 6 are simultaneously deposited on to the port stations 74, with the lateral displacement devices 65 simultaneously moving the containers between the conveyors 68,69 and the port station 74.

In FIG. 15, two multi-trolley vehicles 45 are illustrated on the track system 8, arranged to travel along the rows extending above the first continuous conveyor 68 and second continuous conveyor 69 respectively. The row comprising the port columns 61 may also be serviced by a port access vehicle 45, or container handling vehicles 9. The multi trolley vehicles 45 in FIG. 15 may be arranged to retrieve a number of storage containers 6 from columns arranged in the grid 4, and deliver them simultaneously down onto the conveyors 68,69. The movement of the storage containers 6 in the relay modules 60 is similar to the sequence as described for FIGS. 9A-11B, however in this aspect, port columns 61 are also arranged above the conveyors 68,69. Storage containers 6 may thus be deposited and retrieved directly between the conveyors 68,69 and the multi-trolley vehicles 45.

FIG. 16 illustrates yet another aspect of the invention, where a port access vehicle 45,46 is arranged to travel along an elevated rail structure, e.g. a monorail, which is supported by upright members. In the disclosed example, the port access vehicle 46 comprises an assembly of several vehicle sections. Each vehicle section comprises a horizontal bar or frame extending over the elevated rail structure, and on both sides of the vehicle body, the horizontal bar supports a storage container lifting and holding device. The port access vehicle 46 in the aspect of FIG. 16, may thus retrieve storage container 6 from storage columns in the grid 4 and transport them to the relay modules 60. In likeness with the aspect of FIG. 15, the port access vehicle 46 may deliver and retrieve the storage containers 6 directly from the conveyors 68,69.

The port access vehicles 45,46 may be arranged to transport the storage containers 6 between storage columns 5 in a transfer zone 35 and the relay modules 60. A plurality of storage containers 6 may thus be temporarily stored in the transfer zone 35, such that a port access vehicle 45,46 may retrieve and deposit a plurality of storage containers 6 in the transfer zone 35 and transport said containers 6 between the relay modules 60 and transfer zone 35 for deposit and retrieval. Port access vehicles 45,46 may work in conjunction with container handling vehicles 9, the container handling vehicles 9 delivering storage containers to the relay modules 60 when the port access vehicles 45,46 are picking up storage containers 6 in the transfer zone 35. In aspects, container handling vehicles 9 may transport storage containers 6 between a transfer zone 35 and the relay modules 60, either in a train-like configuration as in FIG. 13 or container handling vehicles 9 may operate independently.

The storage columns 5 in the transfer zones 35 are preferably standard columns 5, and the location of the transfer zone 35 in the grid may thus be continuously changed. As illustrated by the dark grey areas in FIG. 17, the transfer zone 35 can be at least one row wide, and may be located at a point within the grid 4 along the same rows as the relay modules 60. The location of the transfer zones 35 and transfer columns is thus preferably always temporarily. This renders possible freeing up area in the grid 4, dependent on the operation of the container handling vehicles 9 and or other vehicles moving on the rail system 8.

Figure 17:
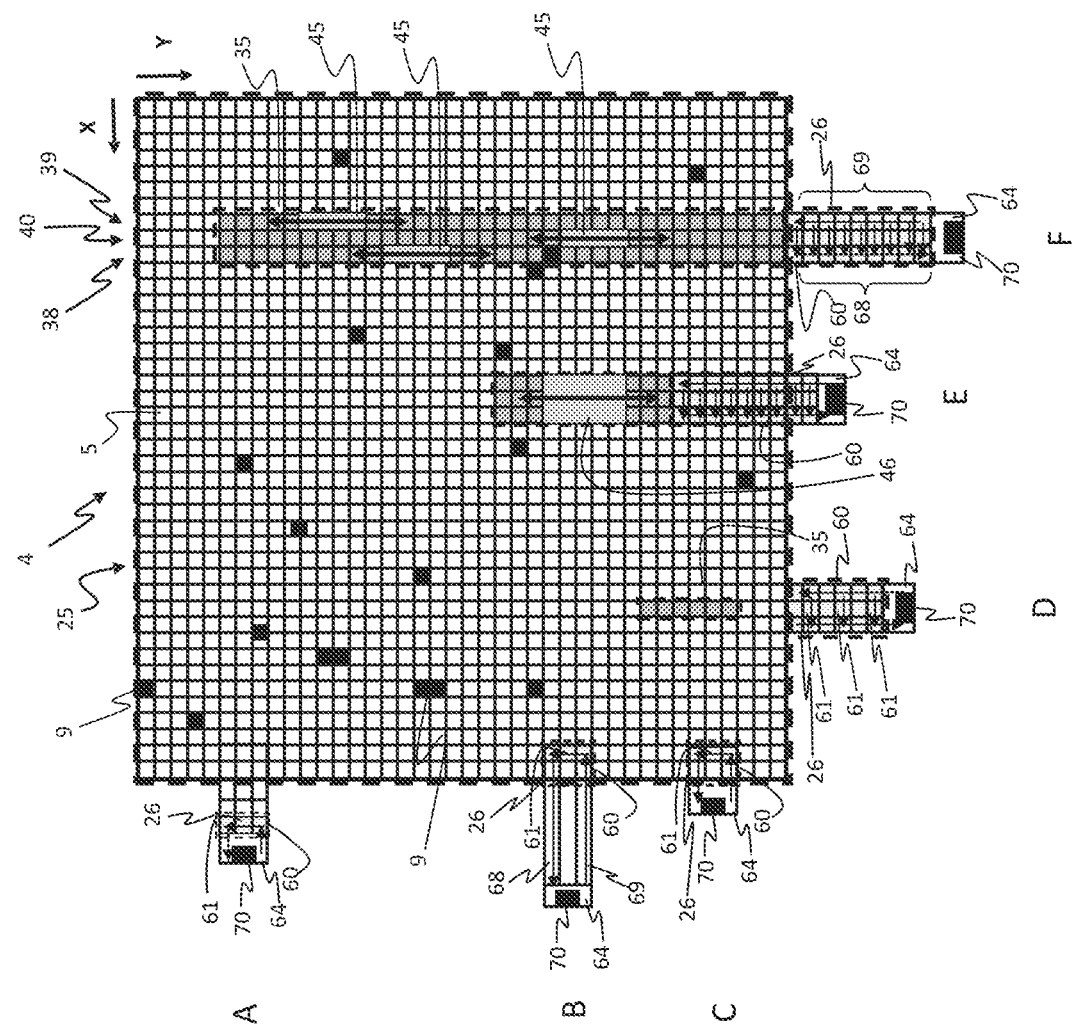
FIG. 17 is a top view of a storage grid with relay modules and transfer zones in and adjoining the grid.

FIG. 17 is a top view of a grid 4 of an automated storage and retrieval system according to the invention where possible positions and shapes of transfer zones 35 and relay modules 60 are indicated. Areas shaded dark grey indicate transfer zones 35 and areas shaded light grey indicate relay modules 60. Each relay module 60 comprising port columns 61 and each transfer zone 35 comprises transfer columns arranged in rows. White grid cells indicate storage columns 5 defining the grid's storage zone 25. Automated container handling vehicles 9 are operated on the grid 4 or rail system 8 as previously discussed, i.e. to transport 30 storage containers 6 between the storage columns 5 and the transfer zones 35 and are shown as black grid cells. Thick arrows extending along the transfer zones 35 indicate the operation of port access vehicles 45 operating as previously discussed, i.e. to transport the storage containers between the transfer zones 35 and the relay modules 60. Dark grey grid cells indicate port access vehicles operating on the grid between the transfer zone 35 and the relay modules 60.

In the disclosed example of portion A in FIG. 17, a similar aspect to the one disclosed in FIGS. 9A-11B is shown in a top view. A relay module 60 is thus illustrated below a track system 8 arranged outside of the storage grid 4. The arrows indicate the transport direction of the storage containers 6 on the relay module 60 and the conveyors 68,69 bringing said containers to and from the access station 64, according to the aforementioned sequence of operation. As the relay module 60 in this example is solitary, it is typically only serviced by container handling vehicles 9 which may deposit and retrieve storage containers 6 through the port column 61.

The example of portion B in FIG. 17 illustrates a relay module 60 integrated in the grid 4. In such aspects, the relay module 60 may either be pre-installed with the grid 4 or storage columns 5 may be removed to make space for the relay module 60. Furthermore, the access station 64 is shown arranged a distance from the relay module 60, and the continuous conveyors 68,69 are thus arranged to extend the distance between the relay module 60 and access station 64. The example in portion C in FIG. 17 is similar to portion B in FIG. 17, but the access station 64 is arranged adjacent the relay module 60 and on the edge of the grid 4, thus not requiring additional conveyors to be arranged in the distance between.

Yet another example is illustrated in portion D of FIG. 17, where a plurality of relay modules are arranged adjoining the grid 4. A transfer zone 35 is in the grid 4 arranged along the same row as the port columns 61 of the relay modules 60.

In this aspect, a plurality of container handling vehicles may be arranged in a train-like configuration as disclosed in FIG. 13 to retrieve and deposit storage containers 6 at the relay modules 60, and transport said containers 6 for retrieval and deposit at the transfer zone 35. In this aspect, the plurality of relay modules 60 are arranged in series, such that they form continuous conveyors 68, 69 leading to the access station 64. The arrows extending across the relay modules 60 show the direction of transport of the storage containers 6.

The example in portion E FIG. 17 illustrates yet another aspect of the invention, where a plurality of relay modules 60 are arranged both within the grid 4 and extending outside of the grid 4. Furthermore, the relay columns 60 are arranged adjacent with a port access vehicle 46, such as the one illustrated in FIG. 16. As previously discussed, the storage containers 6 may in this embodiment be directly deposited onto the continuous conveyors 68, 69 by the port access vehicle 45.

An example of multi-trolley port access vehicles 45 being used in combination with a transfer zone 35 is illustrated in portion F of FIG. 17. The port access vehicles 45 may comprise similar multi-trolley vehicles as disclosed in FIGS. 14 and 15, where each port access vehicle 45 services a row on the relay modules 60.

In the preceding description, various aspects of an automated storage and retrieval system according to the invention have been described with reference to the illustrative embodiment. However, this description is not intended to be construed in a limiting sense. Various modifications and variations of the illustrative embodiment, as well as other embodiments of the system, which are apparent to persons skilled in the art, are deemed to lie within the scope of the present invention as defined by the following claims.

REFERENCE NUMERALS

1 Framework structure
2 Upright member
3 Horizontal member
4 Storage grid
5 Storage column
6 Storage container
7 Stack
8 Track system
9 Container handling vehicle
10 First set of tracks
11 Second set of tracks
12 Grid column
13 Vehicle body
14 First set of wheels
15 Second set of wheels
16 Lifting device (elevator)
18 Lifting frame
19 First port column
20 Second port column
22 Footprint
25 Storage zone
26 Port zone
31 Access and transfer system
32 Access station
35 Transfer zone
38 row
39 row
40 Intermediate column row
45 Multi trolley vehicle
46 Port access vehicle
60 Relay module
61 Port column
62 First conveyor
63 Second conveyor
64 Access station
65 Lateral displacement device
66 First conveyor position
67 Second conveyor position
68 First continuous conveyor
69 Second continuous conveyor
70 Picking station
71 Rail mounted trolley
74 Port station
75 Elevatable beam
76 Guide panel
77 Driving belt
78 Lifting rod
79 Guiding chain
80 Lifting motor
81 Trolley rails
82 Guide fence
83 Blocking panel
84 Relay module framework
85 Conveyor railing
86 Lifting shaft
87 First grid cell
88 Middle grid cell
89 Second grid cell

What is claimed is:

1. A relay module for an automated storage and retrieval system, the relay module for relaying storage containers between a port column and an access station of the automated storage and retrieval system, wherein the port column is arranged to allow pick-up and drop-off of storage containers from container handling vehicles therethrough, and wherein the relay module comprises:
   a port station for receiving storage containers dropped off from and to be picked up through the port column, wherein the port station is arranged at a lower end of the port column;
   a respective first conveyor and/or second conveyor, arranged at a side of the port station, the first conveyor being adapted to transport storage containers to the access station and the second conveyor being adapted for transporting storage containers from the access station; and
   a lateral displacement device that is coupled to the port station and is arranged for transporting storage containers—
   between the port station and the first conveyor; or
   between the second conveyor and the port station; or
   between the port station and the first conveyor, and between the second conveyor and the port station.

2. The relay module according to claim 1, wherein the access station comprises:
   a picking station,
   a third conveyor and a fourth conveyor, arranged at a side of the picking station, and each of the third conveyor and the fourth conveyor is adapted to be arranged in series with the respective first conveyor and/or the second conveyor, respectively, of the relay module to form a first continuous conveyor and a second continuous conveyor, and
   a second lateral displacement device arranged for transporting storage containers between the picking station and the third conveyor and the fourth conveyor.

3. The relay module according to claim 1, wherein the lateral displacement device comprises elevatable beams movable in a direction perpendicular to a transport direction of the first conveyor and the second conveyor.

4. The relay module according to claim 3, wherein the elevatable beams are arranged to simultaneously move two storage containers adjacent to each other.

5. The relay module according to claim 1, wherein the lateral displacement device comprises a weighing mechanism.

6. An automated storage and retrieval system comprising:
a plurality of storage columns, each storage column being arranged to store a respective stack of storage containers within the plurality of storage columns, wherein each storage column is located vertically below a grid opening;
a plurality of container handling vehicles for moving storage containers stacked in the stacks;
at least one port column, the at least one port column forming a downwards vertical projection of a grid opening through which the plurality of container handling vehicles can drop off and pick up storage containers; and
at least one relay module according to any previous claim.

7. The automated storage and retrieval system according to claim 6, further comprising a track system comprising a first set of parallel tracks arranged in a horizontal plane and extending in a first direction, and a second set of parallel tracks arranged in the horizontal plane and extending in a second direction which is orthogonal to the first direction, the first set of parallel tracks and the second set of parallel tracks forming a grid pattern in the horizontal plane comprising a plurality of adjacent grid cells, each grid cell comprising a grid opening defined by a first pair of neighboring tracks of the first set of parallel tracks and a second pair of neighboring tracks of the second set of parallel tracks, wherein each container handling vehicle of the plurality of container handling vehicles is configured to move on the track system above the plurality of storage columns.

8. The automated storage and retrieval system according to claim 7,
wherein the track system comprises at least one transfer zone for temporarily storing storage containers when in transit between the plurality of storage columns and the at least one relay module; and
wherein the plurality of container handling vehicles are arranged to transport the storage containers between the plurality of storage columns and the at least one transfer zone.

9. The automated storage and retrieval system according to claim 8, wherein a port access vehicle is arranged to transport the storage containers between the at least one transfer zone and the at least one relay module, on the track system or in a plane located above the track system.

10. The automated storage and retrieval system according to claim 6, wherein the plurality of container handling vehicles are arranged to transport the storage containers between the plurality of storage columns and the at least one relay module.

11. The automated storage and retrieval system according to claim 6,
wherein a plurality of relay modules are arranged in series,
wherein respective first conveyors of each of the plurality of relay modules cooperate to form a first continuous conveyor, and/or
wherein respective second conveyors of each of the plurality of relay modules cooperate to form a second continuous conveyor.

12. A method of operating a relay module, the relay module having a structure as recited in claim 1, wherein the method comprises:
utilising the lateral displacement device, transporting storage containers—
from the port station to the first conveyor; or
from the port station to the first conveyor and from the second conveyor to the port station; or
from the second conveyor to the port station.

13. The method according to claim 12, further comprising:
utilising the first conveyor, transporting storage containers from the relay module to an access station, and utilising the second conveyor, transporting storage containers from the access station to the relay module; or
utilising the second conveyor, transporting storage containers from the access station to the relay module.

14. The method according to claim 12, further comprising utilising the lateral displacement device to transport a storage container from the port station to the first conveyor while simultaneously transporting another storage container from the second conveyor to the port station.

* * * * *